(12) United States Patent
Terasaki et al.

(10) Patent No.: US 9,998,718 B2
(45) Date of Patent: Jun. 12, 2018

(54) IMAGE DISPLAY APPARATUS, LIGHT SOURCE APPARATUS, AND OPTICAL UNIT

(71) Applicant: Sony Corporation, Tokyo (JP)

(72) Inventors: Kazuya Terasaki, Shizuoka (JP); Daisuke Ogawa, Aichi (JP); Hiroyuki Meguro, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/493,853

(22) Filed: Apr. 21, 2017

(65) Prior Publication Data

US 2017/0295348 A1 Oct. 12, 2017

Related U.S. Application Data

(63) Continuation of application No. 14/783,951, filed as application No. PCT/JP2014/002392 on May 1, 2014, now Pat. No. 9,674,494.

(30) Foreign Application Priority Data

Jun. 6, 2013 (JP) .................................. 2013-119837

(51) Int. Cl.
*G03B 21/16* (2006.01)
*H04N 9/31* (2006.01)
(Continued)

(52) U.S. Cl.
CPC ........... *H04N 9/3144* (2013.01); *G03B 21/16* (2013.01); *G03B 21/204* (2013.01);
(Continued)

(58) Field of Classification Search
CPC ........ G03B 21/14; G03B 21/16; G03B 21/26; G03B 21/28; G03B 21/2033; H04N 9/30;
(Continued)

(56) References Cited

U.S. PATENT DOCUMENTS

| 2002/0001065 A1 | 1/2002 | Takizawa et al. |
| 2002/0021415 A1 | 2/2002 | Fujimori et al. |

(Continued)

FOREIGN PATENT DOCUMENTS

| CN | 101369094 | 10/2010 |
| JP | 2003-066407 | 3/2003 |

(Continued)

OTHER PUBLICATIONS

International Search Report dated Aug. 12, 2014 in PCT/JP2014/002392 (with partial English language translation).
(Continued)

*Primary Examiner* — Sultan Chowdhury
(74) *Attorney, Agent, or Firm* — Oblon, McClelland, Maier & Neustadt, L.L.P.

(57) ABSTRACT

An image display apparatus includes a laser light source, a light modulator, a first sensor, a second sensor, a third sensor, and circuitry. The light modulator generates an image based on light from the laser light source. The first sensor measures a first temperature in a vicinity of an air inlet of a housing of the image display apparatus. The second sensor measures a second temperature associated with the laser light source. The third sensor measures a third temperature associated with the light modulator. The circuitry is configured to control output of the laser light source based on at least one of the first, second, or third temperatures.

12 Claims, 16 Drawing Sheets

(51) Int. Cl.
*G03B 21/20* (2006.01)
*G03B 33/12* (2006.01)

(52) U.S. Cl.
CPC ....... *G03B 21/208* (2013.01); *G03B 21/2013* (2013.01); *G03B 21/2066* (2013.01); *G03B 21/2073* (2013.01); *G03B 33/12* (2013.01); *H04N 9/3105* (2013.01); *H04N 9/3155* (2013.01); *H04N 9/3161* (2013.01); *H04N 9/3167* (2013.01); *H04N 9/3194* (2013.01)

(58) Field of Classification Search
CPC ...... H04N 9/31; H04N 9/3144; H04N 9/3155; H04N 9/3194
See application file for complete search history.

(56) References Cited

U.S. PATENT DOCUMENTS

| | | | |
|---|---|---|---|
| 2006/0290895 A1* | 12/2006 | Park | G03B 21/16 353/61 |
| 2007/0132706 A1 | 6/2007 | Nishimura | |
| 2008/0180643 A1 | 7/2008 | Endo | |
| 2009/0009729 A1* | 1/2009 | Sakai | G03B 21/16 353/57 |
| 2009/0046255 A1 | 2/2009 | Kato | |
| 2010/0277701 A1* | 11/2010 | Yamamoto | B01D 46/18 353/57 |
| 2011/0242496 A1 | 10/2011 | Kimoto et al. | |
| 2011/0285971 A1* | 11/2011 | Oka | H04N 9/3194 353/70 |
| 2012/0268917 A1 | 10/2012 | Kitano | |
| 2012/0327379 A1 | 12/2012 | Enomoto et al. | |
| 2013/0070208 A1 | 3/2013 | Nakanishi | |

FOREIGN PATENT DOCUMENTS

| | | |
|---|---|---|
| JP | 2010-186750 | 8/2010 |
| JP | 2011-227468 A | 11/2011 |
| JP | 2012-32583 A | 2/2012 |
| JP | 2012-43700 A | 3/2012 |
| JP | 2012-118220 | 6/2012 |
| JP | 2012-155003 A | 8/2012 |
| JP | 2012-173593 A | 9/2012 |
| JP | 2012-215750 A | 11/2012 |
| JP | 2013-7967 A | 1/2013 |
| WO | WO 2011/148507 A1 | 12/2011 |

OTHER PUBLICATIONS

Extended European Search Report dated Nov. 23, 2016 in European Patent Application No. 14808279.5.
Office Action dated Dec. 1, 2016 in Chinese Patent Application No. 201480030501.2.
Combined Chinese Office Action and Search Report dated Jun. 20, 2017 in Patent Application No. 201480030501.2 (with English Translation).
Office Action dated Jan. 16, 2018 in Japanese Patent Application No. 2015-521269.

* cited by examiner

IMAGE DISPLAY APPARATUS, LIGHT SOURCE APPARATUS, AND OPTICAL UNIT

CROSS-REFERENCE TO RELATED APPLICATIONS

This application is a continuation of U.S. application Ser. No. 14/783,951, filed Oct. 12, 2015, the entire content of which is incorporated herein by reference. U.S. application Ser. No. 14/783,951 is a National Stage of PCT/JP2014/002392, filed May 1, 2014, which claims priority under 35 U.S.C. 119 to Japanese Patent Application No. 2013-119837 filed Jun. 6, 2013.

TECHNICAL FIELD

The present technology relates to an image display apparatus such as a projector, a light source apparatus, and an optical unit.

BACKGROUND ART

An image display apparatus such as a projector has been widely used from the past. For example, light from a light source is modulated by a light modulation element such as a liquid crystal element, and the modulated light is projected on a screen or the like, thus displaying an image. For example, Patent Document 1 describes a projector including a light source apparatus. The light source apparatus is formed of a lamp, such as a halogen lamp, and a reflector that reflects light of the lamp. Patent Document 1 describes a technology for suppressing a decrease in reliability due to the rise of the internal temperature of the projector (paragraph [0056] etc. of Patent Document 1).

Recently, products that adopts solid-state light sources, such as an LED (light-emitting diode) and an LD (laser diode), as light sources used in projectors, have been increasingly used instead of mercury lamps, xenon lamps, and the like used in related art. The fixed light sources such as LEDs have advantages such as having long lifetime, no replacement of lamps, which is necessary in related art, and lighting-up immediately after power-on.

For example, Patent Document 2 describes a projector in which a solid-state light source is used as an excitation light source. Blue laser light that is output from the solid-state light source is applied to a phosphor wheel as excitation light. The phosphor wheel includes a base and a phosphor layer formed thereon. Excitation light is applied to the phosphor layer, and thus yellow fluorescence is emitted. The blue light and yellow light emitted from the phosphor layer are combined, to output white light (paragraphs [0028], [0029], etc. of Patent Document 2).

Patent Document 2 describes heat generation of the phosphor wheel due to the application of the laser light. For example, when the application amount to the phosphor wheel is increased so as to improve the output of the light source apparatus, the amount of heat generation from the phosphor wheel is also increased. In Patent Document 1, cooling of the phosphor wheel is achieved by applying the excitation light to a predetermined position while rotating the phosphor wheel. Further, cooling performance is improved by using crystalline members excellent in thermal conductivity, such as crystal and sapphire, for the base material of the phosphor wheel (paragraphs [0005], [0006], etc. of Patent Document 2).

Patent Document 1: Japanese Patent Application Laid-open No. 2012-215750

Patent Document 2: Japanese Patent Application Laid-open No. 2012-173593

SUMMARY OF INVENTION

Problem to be Solved by the Invention

In such a manner, in the case where the solid-state light source is used as a light source, it is important to sufficiently prevent deterioration and the like of members, which is associated with a temperature rise and the like. In other words, there is a demand for an apparatus capable of properly operating in accordance with a temperature rise and the like.

In view of the circumstances as described above, it is an object of the present technology to provide an image display apparatus including a solid-state light source, a light source apparatus used therefor, and an optical unit, which are capable of properly operating in accordance with a change in temperature environment.

Means for Solving the Problem

In order to achieve the object described above, according to an embodiment of the present technology, there is provided an image display apparatus including a light source section, an image generation section, a projection section, a housing, a first sensor, and a control section.

The light source section includes a light source unit including one or more solid-state light sources.

The image generation section generates an image based on light from the light source unit.

The projection section projects the image generated by the image generation section.

The housing includes an outer frame and an inlet, the outer frame surrounding the light source section, the image generation section, and the projection section, the inlet being formed in the outer frame and taking in external air.

The first sensor is arranged in the vicinity of the inlet and measures a temperature of the external air as an external temperature, the external air being taken in from the inlet.

The control section controls output of the one or more fixed light sources based on the external temperature measured by the first sensor.

In this image display apparatus, the temperature of the external air taken in from the inlet is measured by the first sensor arranged in the vicinity of the inlet. The output of the one or more fixed light sources is then controlled based on the measured external temperature. Consequently, a proper operation corresponding to a change mainly in external temperature environment can be performed.

The control section may decrease the output of the one or more solid-state light sources in accordance with a rise of the external temperature.

Consequently, deterioration and the like of the internal components etc., which is associated with the rise of the external temperature, can be prevented.

In a case where a predetermined temperature is set as a first reference temperature and the external temperature is higher than the first reference temperature, the control section may decrease the output in accordance with a temperature difference between the external temperature and the first reference temperature.

Consequently, a proper operation corresponding to the rise of the external temperature can be prevented.

The image display apparatus may further include a second sensor that is arranged in the light source unit and measures a temperature of the one or more solid-state light sources as a light source temperature. In this case, the control section may control the output of the one or more fixed light sources based on the light source temperature measured by the second sensor.

Consequently, it is possible to prevent the components from being deteriorated due to an excessive light application in a low-temperature state where the light source temperature is low, for example.

The control section may decrease the output of the one or more solid-state light sources in accordance with a decrease of the light source temperature.

Consequently, it is possible to prevent the components from being deteriorated due to an excessive light application in the low-temperature state, for example.

In a case where a predetermined temperature is set as a second reference temperature and the light source temperature is lower than the second reference temperature, the control section may decrease the output in accordance with a temperature difference between the light source temperature and the second reference temperature.

For example, a recommended operating temperature may be set as the second reference temperature. Another temperature may be set as the second reference temperature. In any case, it is possible to prevent the components from being deteriorated due to an excessive light application in the low-temperature state, for example.

The image generation section may include one or more light modulation elements that modulate incident light, and an optical system that inputs light from the light source section to the one or more light modulation elements and outputs modulated light to the projection section, the modulated light being modulated by the one or more light modulation elements.

In this case, the image display apparatus may further include a sending section and a third sensor.

The sending section includes a filter and sends the external air to the optical system via the filter.

The third sensor is arranged in the optical system and measures a temperature of the optical system as an optical system temperature.

The control section may determine a state of the filter based on the optical system temperature measured by the third sensor.

Consequently, it is possible to prevent a temperature rise due to clogging of the filter, and the like. As a result, it is possible to prevent thermal deterioration and the like of the optical system, the light modulation elements, and other components.

The one or more light modulation elements may include three light modulation elements that respectively modulate red light, green light, and blue light. In this case, the optical system may include a red optical system, a blue optical system, and a green optical system as optical systems for light of the respective colors. Further, the third sensor may be arranged in the blue optical system.

In the image display apparatus, the third sensor is arranged in the blue optical system for blue light that is the shortest wavelength and has high energy. Consequently, a highly-accurate operation corresponding to a change in optical system temperature can be performed.

The blue optical system may include a polarizing plate that controls a polarization state of the blue light. In this case, the third sensor may be arranged in the polarizing plate.

In such a manner, the temperature of the polarizing plate may be measured as the optical system temperature. Consequently, an appropriate operation can be performed.

In a case where a predetermined temperature is set as a third reference temperature and the optical system temperature is higher than the third reference temperature, the control section may output an indication for a replacement of the filter.

Consequently, it is possible to prevent a thermal influence due to the deterioration of the filter, and the like.

In a case where a predetermined temperature is set as a third reference temperature and the optical system temperature is higher than the third reference temperature, the control section may stop an operation of the image display apparatus.

Consequently, it is possible to prevent a thermal influence due to the deterioration of the filter, and the like.

According to an embodiment of the present technology, there is provided a light source apparatus including a light source unit, an output section, and a sensor section.

The light source unit includes one or more solid-state light sources each capable of outputting light in a predetermined wavelength range as output light.

The output section includes a light emitter, the light emitter being excited by light from the light source unit and emitting visible light in a wavelength range longer than the wavelength range of the light, and is capable of outputting light containing the light in the predetermined wavelength range and the visible light from the light emitter.

The sensor section includes a sensor and a control section, the sensor being arranged in the light source unit and measuring a temperature of the one or more solid-state light sources as a light source temperature, the control section controlling output of the one or more fixed light sources based on the light source temperature measured by the sensor.

According to an embodiment of the present technology, there is provided an optical unit including one or more light modulation elements, an optical system, and a sensor.

The one or more light modulation elements modulate incident light.

The optical system inputs light from one or more solid-state light sources to the one or more light modulation elements and outputs modulated light to a projection optical system, the modulated light being modulated by the one or more light modulation elements, the projection optical system being capable of projecting light.

The sensor is arranged in the optical system and measures a temperature of the optical system as an optical system temperature.

Effect of the Invention

As described above, according to the present technology, it is possible to provide an image display apparatus including a solid-state light source, a light source apparatus used therefor, and an optical unit, which are capable of properly operating in accordance with a change in temperature environment.

MODE(S) FOR CARRYING OUT THE INVENTION

Hereinafter, embodiments of the present technology will be described with reference to the drawings.

[Image Display Apparatus]

Figure 1:
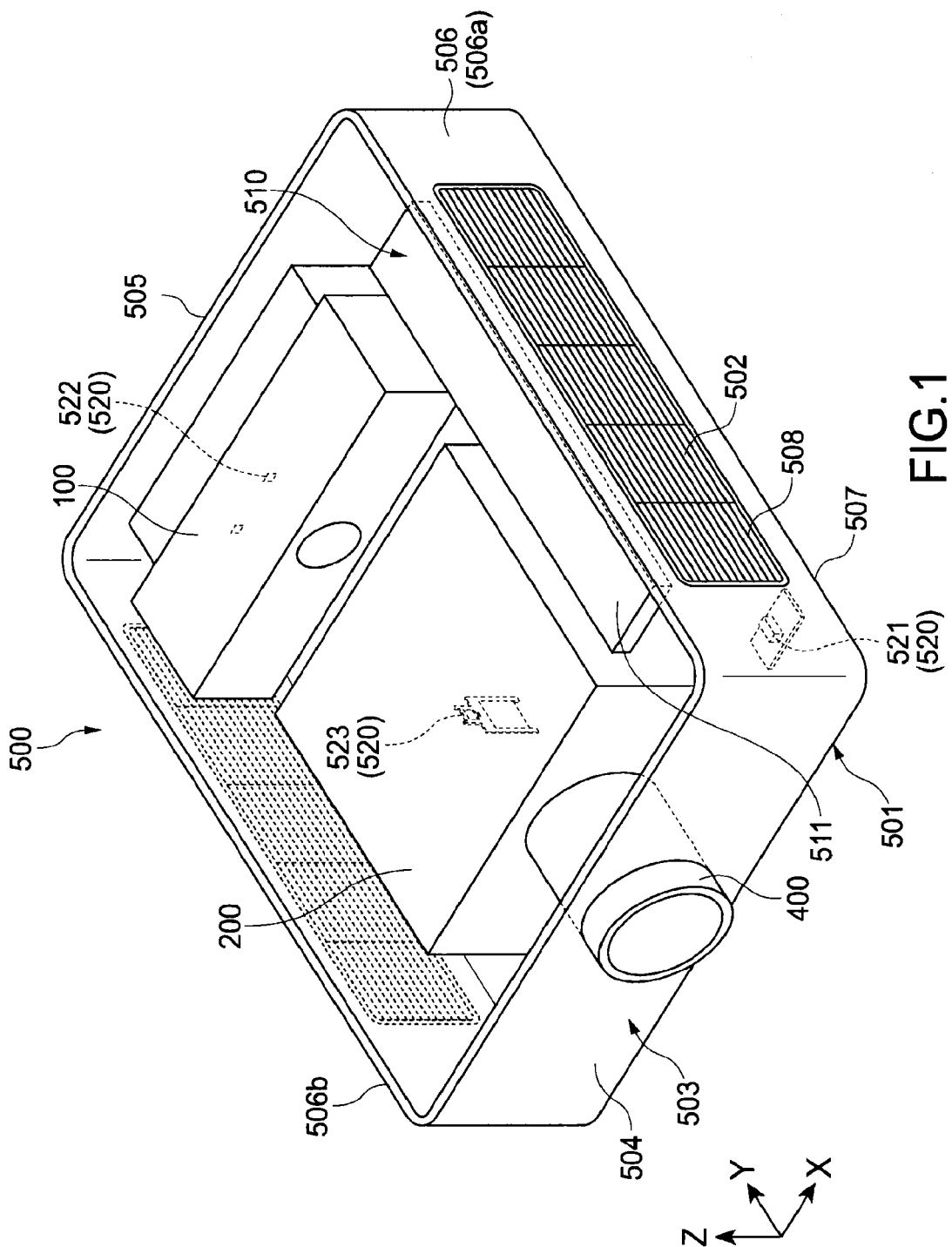
FIG. 1 is a schematic view showing a configuration example of an image display apparatus according to an embodiment of the present technology.

FIG. 1 is a schematic view showing a configuration example of an image display apparatus according to an embodiment of the present technology. An image display apparatus 500 is used as a projector for presentation or for digital cinema, for example. The present technology described hereinafter is also applicable to image display apparatuses used for other applications.

The image display apparatus 500 includes a light source section 100, an image generation section 200, and a projection section 400. The light source section 100 is capable of outputting light. The image generation section 200 generates an image based on the light from the light source section 100. The projection section 400 projects an image generated by the image generation section 200 onto a screen or the like. Additionally, the image display apparatus 500 includes a housing 503 including an outer frame 501 and inlets 502. The outer frame 501 surrounds the light source section 100, the image generation section 200, and the projection section 400. Each of the inlets 502 is formed in the outer frame 501 and takes in external air.

The outer frame 501 has a substantially rectangular parallelepiped shape and includes a front surface portion 504, a back surface portion 505, side surface portions 506, a bottom surface portion 507, and a top surface portion. The inlets 502 are formed in two side surface portions 506a and 505b of the outer frame 501 to have a rectangular shape extending in a front-back direction (y-axis direction) from the front surface portion 504 toward the back surface portion 505. Each of the inlets 502 is provided with a plurality of tilted, eave-like fins 508 in order to prevent foreign substances from entering the inside. It should be noted that the illustration of the top surface portion is omitted in FIG. 1.

Further, the image display apparatus 500 includes a sending section 510 that sends external air to an illumination optical system 220 of the image generation section 200 (see FIG. 2) so as to cool the illumination optical system 220. The sending section 510 includes a filter 511 and a fan mechanism not shown. In this embodiment, the filter 511 is arranged along the inlet 502 at a position that is on the inner side of the housing 503 and opposed to the inlet 502 formed in the side surface portion 506. The fan mechanism is arranged below the filter 511. When the fan mechanism is driven, the external air taken in from the inlet 502 is blown to the illumination optical system 220 through the filter 511. It should be noted that the configuration of the sending section 510 is not limited, and any configuration may be adopted as long as external air is sent to the illumination optical system 220 through the filter 511. The type of the filter 511 is also not limited, and any type of filter may be adopted as long as the filter can prevent the entry of dust, dirt, and the like from the outside. For example, there are a sponge type and an electrically-charged type.

Further, the image display apparatus 500 includes a sensor mechanism 520. The sensor mechanism 520 includes an environmental temperature sensor (first sensor) 521 that is arranged in the vicinity of the inlet 502, a light source temperature sensor (second sensor) 522 that is arranged in the light source section 100, and an optical system temperature sensor (third sensor) 523 that is arranged in the illumination optical system 220 of the image generation section 200. The sensor mechanism 520 will be described later in detail.

Figure 2:
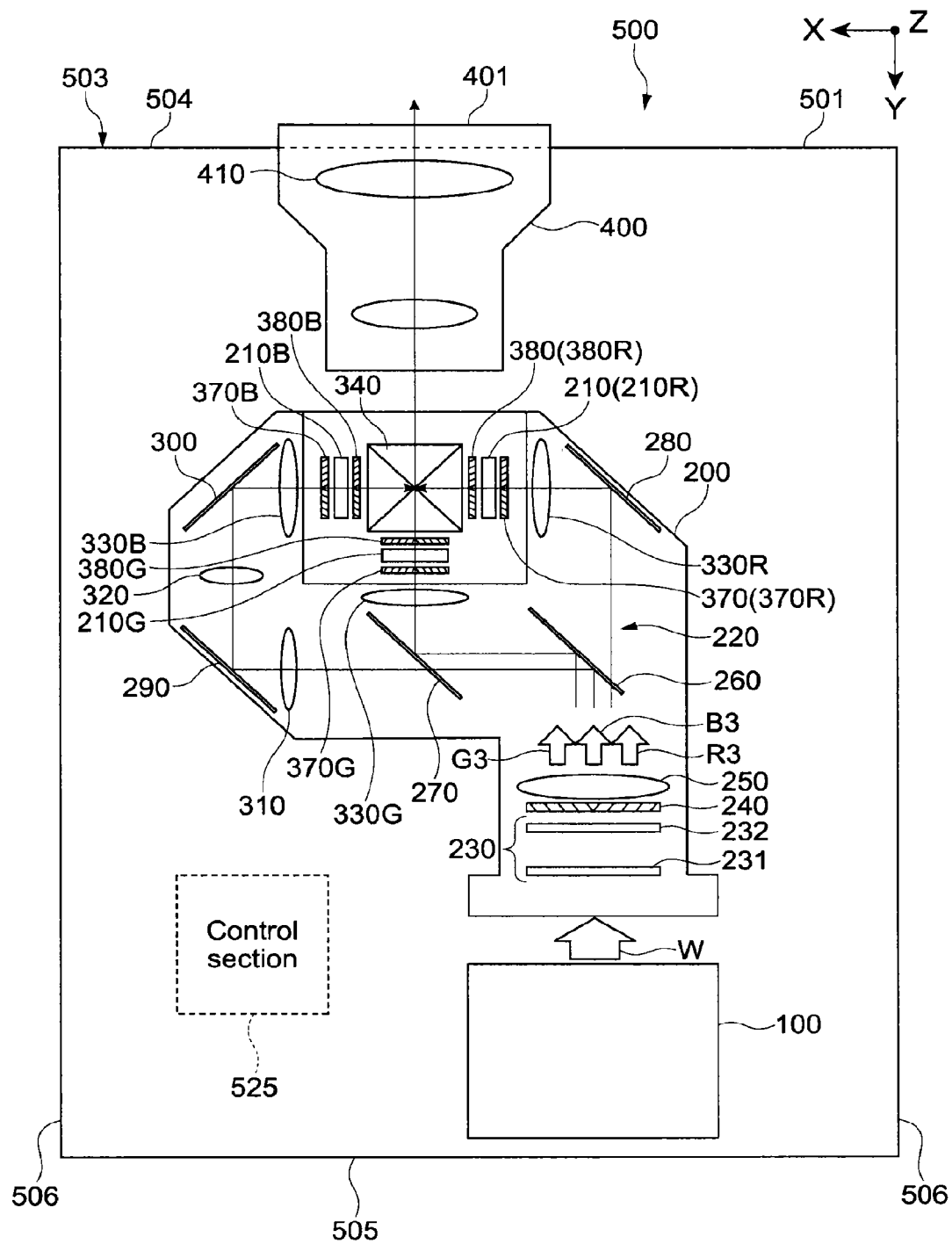
FIG. 2 is a schematic view showing a configuration example of an image generation section and a projection section of the image display apparatus.

Further, the image display apparatus 500 includes a control section 525 that is capable of controlling operations of the respective mechanisms in the apparatus (see FIG. 2). The control section 525 is electrically connected to the light source section 100, the image generation section 200, the projection section 400, the fan mechanism, the sensor mechanism 520, and other mechanisms and outputs control signals to the respective mechanisms. For example, based on temperature information measured by the sensor mechanism 520 and the like, the operations of the light source section 100 and the like can be controlled, or the operation of the image display apparatus 500 can be stopped.

The control section 525 includes, for example, a CPU, a RAM, and a ROM and controls the mechanisms by the CPU loading a control program, which is previously recorded on the ROM, to the RAM and executing the control program. The configuration of the control section 525 is not limited, and any hardware or software may be used. For example, a PLD (Programmable Logic Device) such as an FPGA (Field Programmable Gate Array) or other devices such as an ASIC (Application Specific Integrated Circuit) may be used. Further, the control section 525 is shown in FIG. 2 by a broken line, but the location at which the control section 525 is arranged, and the like are also not limited and may be appropriately set.

FIG. 2 is a schematic view showing a configuration example of the image generation section 200 and the projection section 400 of the image display apparatus 500. As shown in FIG. 2, the light source section 100, the image generation section 200, and the projection section 400 are arranged from the back surface portion 505 toward the front surface portion 504 of the outer frame 501. The projection section 400 is arranged such that its output surface 401 protrudes from the front surface portion 504 to the outside.

The image generation section 200 generates an image based on white light W containing red light, green light, and blue light that are output from the light source section 100. The image generation section 200 includes an image generation element 210 and the illumination optical system 220. The image generation element 210 generates an image based on applied light. The illumination optical system 220 applies output light, which is output from the light source section 100, to the image generation element 210. The projection section 400 projects the image generated by the image generation element 210.

In this embodiment, the image generation element 210 corresponds to a light modulation element that modulates incident light. Further, the illumination optical system 220 corresponds to an optical system that inputs light from the light source section to one or more light modulation elements and outputs modulated light, which is modulated by the one or more light modulation elements, to the projection section 400. Furthermore, the projection section 400 corresponds to a projection optical system that is capable of projecting light.

As shown in FIG. 2, the image generation section 200 includes an integrator element 230, a polarization conversion element 240, and a light collecting lens 250. The integrator element 230 includes a first fly-eye lens 231 and a second fly-eye lens 232. The first fly-eye lens 231 includes a plurality of microlenses two-dimensionally arrayed. The second fly-eye lens 232 includes a plurality of microlenses that are arrayed to correspond to the respective microlenses of the first fly-eye lens 231.

Parallel light that is input to the integrator element 230 from the light source section 100 is split into a plurality of light fluxes by the microlenses of the first fly-eye lens 231 to form images on the corresponding microlenses of the second fly-eye lens 232. The microlenses of the second fly-eye lens 232 each function as a secondary light source and apply a plurality of parallel light beams with the same luminance to the polarization conversion element 240 as incident light.

The integrator element 230 has a function of trimming the incident light to be applied to the polarization conversion element 240 from the light source section 100 so as to have a uniform luminance distribution as a whole.

The polarization conversion element 240 has a function of making a polarization state of the incident light uniform, the incident light being input via the integrator element 230 and the like. The polarization conversion element 240 outputs output light containing blue laser light B3, green light G3, and red light R3 via the light collecting lens 250 and the like, the light collecting lens 250 being arranged on the output side of the light source section 100, for example.

The illumination optical system 220 includes dichroic mirrors 260 and 270, mirrors 280, 290, and 300, relay lenses 310 and 320, field lenses 330R, 330G, and 330B, liquid crystal light valves 210R, 210G, and 210B serving as the image generation elements, and a dichroic prism 540. The liquid crystal light valves 210R, 210G, and 210B correspond to three light modulation elements that modulate red light, green light, and blue light, respectively, in this embodiment.

Further, the illumination optical system 220 includes incident polarizing plates 370 and outgoing polarizing plates 380 that are arranged on optical paths of the respective color light beams. The incident polarizing plate 370 and the outgoing polarizing plate 380 are arranged so as to sandwich the liquid crystal light valve 210 for each color between the input side and the output side of the liquid crystal light valve 210. Therefore, an incident polarizing plate 370R and an outgoing polarizing plate 380R are arranged in front and back of the liquid crystal light valve 210R, an incident polarizing plate 370G and an outgoing polarizing plate 380G are arranged in front and back of the liquid crystal light valve 210G, and an incident polarizing plate 370B and an outgoing polarizing plate 380B are arranged in front and back of the liquid crystal light valve 210B.

The incident polarizing plate 370 controls a polarization state of light that is input to the liquid crystal light valve 210, to make a polarization direction of the light uniform. Consequently, the polarization degree of the light is improved, and an image can be generated and displayed with high accuracy. The outgoing polarizing plate 380 controls a polarization state of modulated light that is modulated by the liquid crystal light valve 210 and improves the polarization degree thereof. Consequently, a high-quality image can be displayed. The specific configurations of the incident polarizing plate 370 and the outgoing polarizing plate 380 are not limited, and any configuration may be adopted.

The dichroic mirrors 260 and 270 have property of selectively reflecting color light in a predetermined wavelength range and transmitting light in the other wavelength range. With reference to FIG. 2, for example, the dichroic mirror 260 selectively reflects the green light G3 and the blue light B3. The dichroic mirror 270 selectively reflects the green light G3 out of the green light G3 and the blue light B3 that have been reflected by the dichroic mirror 260. The remaining blue light B3 passes through the dichroic mirror 270. Consequently, the light output from the light source section 100 is split into a plurality of color light beams with different colors. It should be noted that the configuration for splitting light into a plurality of color light beams, devices to be used, and the like are not limited.

The split red light R3 is reflected on the mirror 280, converted into parallel light by passing through the field lens 330R, and then input into the liquid crystal light valve 210R for red light modulation via the incident polarizing plate 370R. The green light G3 is converted into parallel light by passing through the field lens 330G and then input into the liquid crystal light valve 210G for green light modulation via the incident polarizing plate 370G. The blue light B3 passes through the relay lens 310 and is reflected on the mirror 290, and further passes through the relay lens 320 and is reflected on the mirror 300. The blue light B3 reflected on the mirror 300 is converted into parallel light by passing through the field lens 330B, and then input into the liquid crystal light valve 210B for blue light modulation via the incident polarizing plate 370B.

The liquid crystal light valves 210R, 210G, and 210B are electrically connected to a signal source (for example, personal computer (PC)) (not shown) that supplies an image signal containing image information. The liquid crystal light valves 210R, 210G, and 210B modulate incident light for each pixel based on the supplied image signals of the respective colors, and generate a red-color image, a green-color image, and a blue-color image, respectively. The modulated light of each color (formed image) is input into the dichroic prism 340 via each of the outgoing polarizing plates 380R, 380G, and 380B, to be combined. The dichroic prism 340 superimposes and combines the light beams of the respective colors that are input from the three directions, and then outputs the combined light toward the projection section 400.

The projection section 400 includes a plurality of lenses 410 and the like and applies the light combined by the dichroic prism 340 onto a screen (not shown). Consequently, a full-color image is displayed.

The illumination optical system 220 shown in FIG. 2 includes a red optical system, a blue optical system, and a green optical system as optical systems for RGB color light beams. In this embodiment, the mirror 280, the field lens 330R, the incident polarizing plate 370R, the liquid crystal light valve 210R, and the outgoing polarizing plate 380R correspond to the red optical system. Further, the dichroic mirror 270, the field lens 330G, the incident polarizing plate 370G, the liquid crystal light valve 210G, and the outgoing polarizing plate 380G correspond to the green optical system. The mirrors 280 and 300, the relay lenses 310 and 320, the field lens 330B, the incident polarizing plate 370B, the liquid crystal light valve 210B, and the outgoing polarizing plate 380B correspond to the blue optical system.

Figure 3:
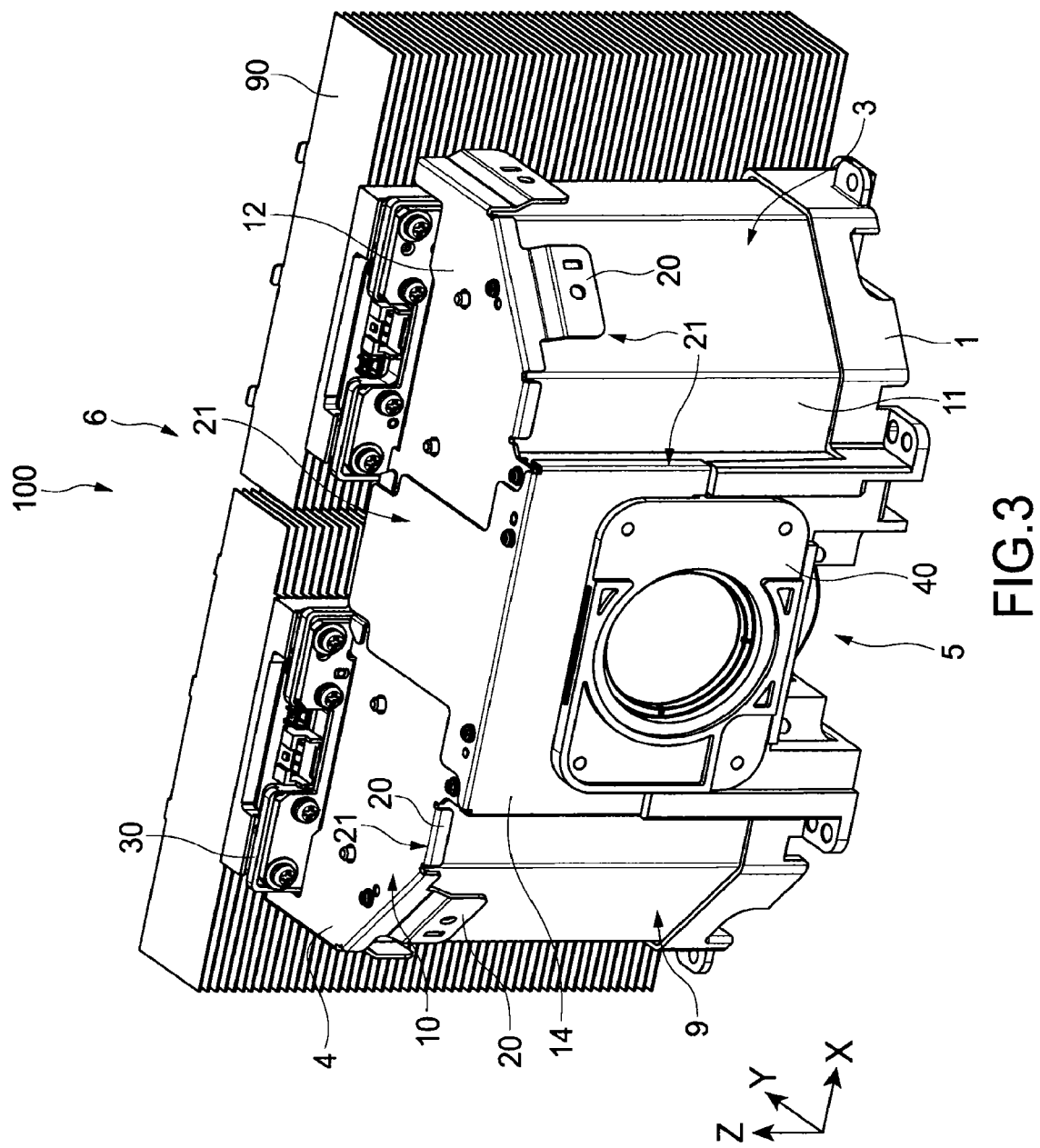
FIG. 3 is a perspective view showing a configuration example of a light source section shown in FIG. 1.
Figure 4:
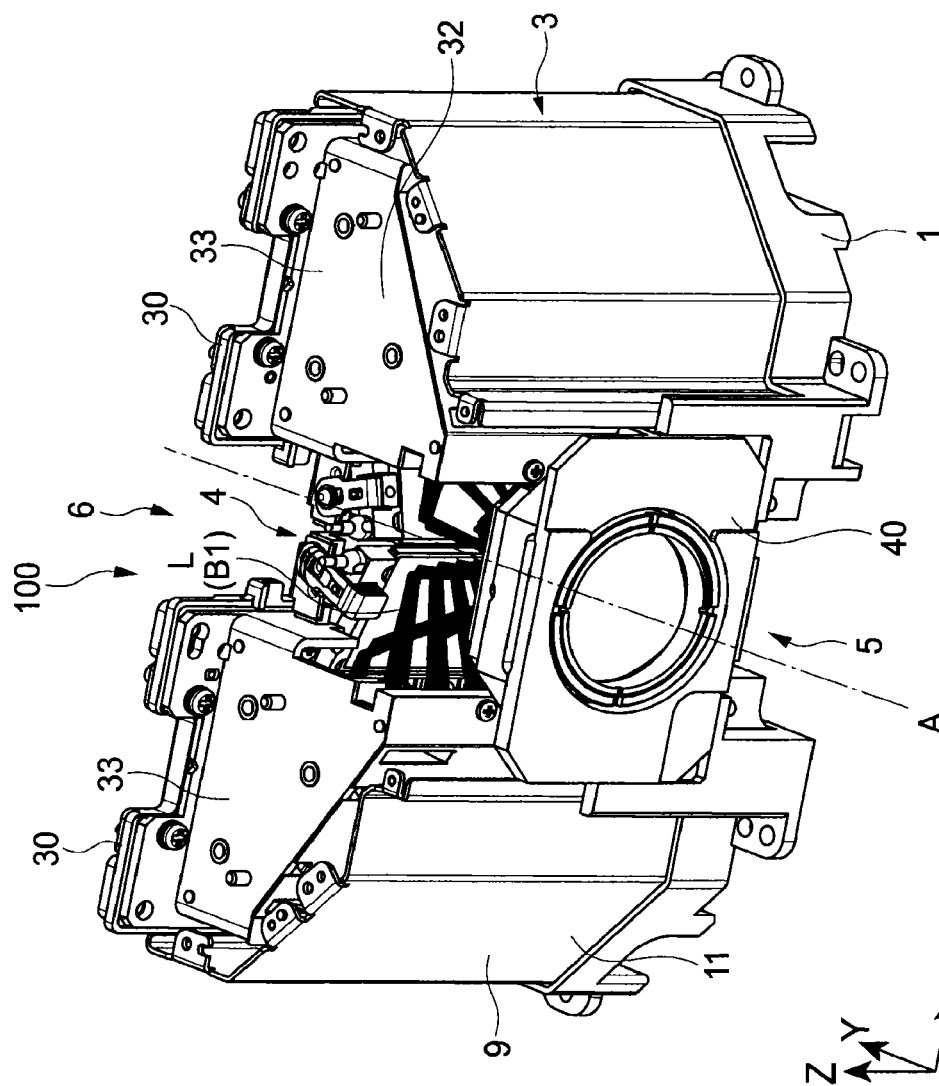
FIG. 4 is a view of the light source section shown in FIG. 3 in a state where a lid portion is removed.

FIG. 3 is a perspective view showing a configuration example of the light source section 100. FIG. 4 is a view of the light source section 100 shown in FIG. 3 in a state where a lid portion 10 is removed. In FIG. 4, the illustration of a heat sink 90 shown in FIG. 3 is omitted.

The light source section 100 combines laser light in a blue wavelength range and light in the range from a red wavelength range to a green wavelength range, the light being generated from a fluorescent substance excited by the laser light, to output white light. As shown in FIG. 1, the light source section 100 includes a base portion 1 and a housing 3. The base portion 1 is provided to the bottom portion. The housing 3 is supported by the base portion 1. Light source units 30 and a phosphor unit 40 are mounted to the base portion 1. The light source units 30 include one or more solid-state light sources. The phosphor unit 40 receives light of the light source units 30, and generates and outputs white light. As shown in FIG. 4, output light L from the light source units 30 is applied to the phosphor unit 40 in a space portion 4 within the housing 3.

The base portion 1 has a flat and elongate shape extending in one direction. A longitudinal direction of the elongated base 1 is a horizontal direction of the light source section 100, and a short-side direction orthogonal to the longitudinal direction is a front-back direction thereof. Therefore, one of the two longitudinal portions that are opposed to each other in the short-side direction is a front side 5, and the other one is a rear side 6. Further, a direction orthogonal to both the longitudinal direction and the short-side direction is a height direction of the light source section 100. In the example shown in FIG. 1, an x-axis direction, a y-axis direction, and a z-axis direction correspond to the horizontal direction, the front-back direction, and the height direction, respectively.

The housing 3 includes a side wall portion 9 and the lid portion 10. The side wall portion 9 extends in the height direction perpendicular to the planar direction of the base portion 1. The lid portion 10 covers the side wall portion 9. In this embodiment, two side wall members 11, a lid member 12, a rear member (not shown), and a front member 14 configure the housing 3 including the side wall portion 9 and the lid portion 10. Those frame members are arranged such that two members overlap each other at adjacent two portions thereof, to form overlapping portions 21. The overlapping portion 21 is a portion in which a part of one member and a part of another member adjacent to the one member are arranged to overlap each other. In the example shown in FIG. 1, the overlapping portion 21 is formed by an upper portion of the side wall member 11 and a folded portion 20 of the lid member 12. The overlapping portions are formed in other portions in which other members are adjacent to each other.

In such a manner, in this embodiment, the plurality of frame members are assembled such that the overlapping portions 21 are formed in adjacent portions of the members. Consequently, it is possible to sufficiently suppress the leakage of output light or reflected light thereof, which is directed to the phosphor unit 40 from the light source unit 30, to the outside of the housing 3. In other words, a light blocking effect by the housing 3 can be improved. Further, comparing the case where the housing 3 is integrally formed, for example, each frame member can be prepared by processing an inexpensive plate or the like, and this makes it possible to assemble the housing 3 inexpensively and easily.

The shape, size, and the like of the overlapping portions 21 are not limited. The overlapping portions 21 only need to be arranged such that at least adjacent members overlap each other. When the overlapping portion 21 is formed in the entire adjacent portions, the light blocking effect is kept to be high. Due to restrictions on design, and the like, however, portions that do not partially overlap each other may be generated. Further, the following design is also adoptable, in which the overlapping portion 21 is increased in size in a portion having a high possibility that light is leaked depending on the positions of the light source units 30 and phosphor unit 40 within the housing 3 and on the position of the optical path of the output light, to improve light blocking performance.

For example, adjacent members may be arranged so as to overlap each other but not to come into contact with each other, and a space may be formed between those members. In this case as well, when the size of the overlapping areas is sufficiently ensured, the leakage of the light can be suppressed. It is also possible to use the space between the members as a flow channel for cooling wind for cooling the phosphor unit and the like. In such a manner, the members that are arranged so as to overlap each other but not to come into contact with each other also form the overlapping portions 21.

Further, the housing 3 is configured by the plurality of frame members, and thus an inlet that takes in cooling wind or an outlet that discharges the cooling wind can be easily formed. Further, a configuration for bending the flow channel for the cooling wind within the space portion 4, and the like can be easily achieved. By appropriately designing the positions of the inlet and the outlet or bending the flow channel for the cooling wind, effective cooling by which the leakage of the output light from the housing 3 is suppressed can be achieved.

As shown in FIG. 4, two light source units 30 are arranged side by side in the longitudinal direction on the rear side 6 of the base portion 1. Each of the light source units 30 includes a plurality of laser light sources 31 capable of outputting blue laser light B1, as one or more fixed light sources (see FIG. 5). With the front-back direction being as an optical-axis direction, the plurality of laser light sources 31 are arranged so as to output the blue laser light B1 along the optical-axis direction toward the front side 5.

Ahead of the two light source units 30, respective light collecting optical systems are arranged. The light collecting optical systems collect the blue laser light B1 from the plurality of laser light sources 31 to a predetermined point of the phosphor unit 40. In FIG. 4, ahead of the light source units 30, support portions 32 are shown. Each of the support portions 32 is a member that supports the light source unit 30 and the light collecting optical system as one unit. This support portion 32 configures a light collecting unit 33 including the light source unit 30 and the light collecting optical system.

With the blue laser light B1 collected by the light collecting units 33 being as excitation light, white light is output from the phosphor unit 40 along the optical axis A. A direction of the optical axis A of the white light is set to be the same direction as the optical-axis direction of the blue laser light B1 from the plurality of laser light sources 31. In other words, the phosphor unit 40 is arranged on the front side 5 of the base portion 1 so as to output the white light in the same direction as the optical-axis direction of the blue laser light B1.

Figure 5:
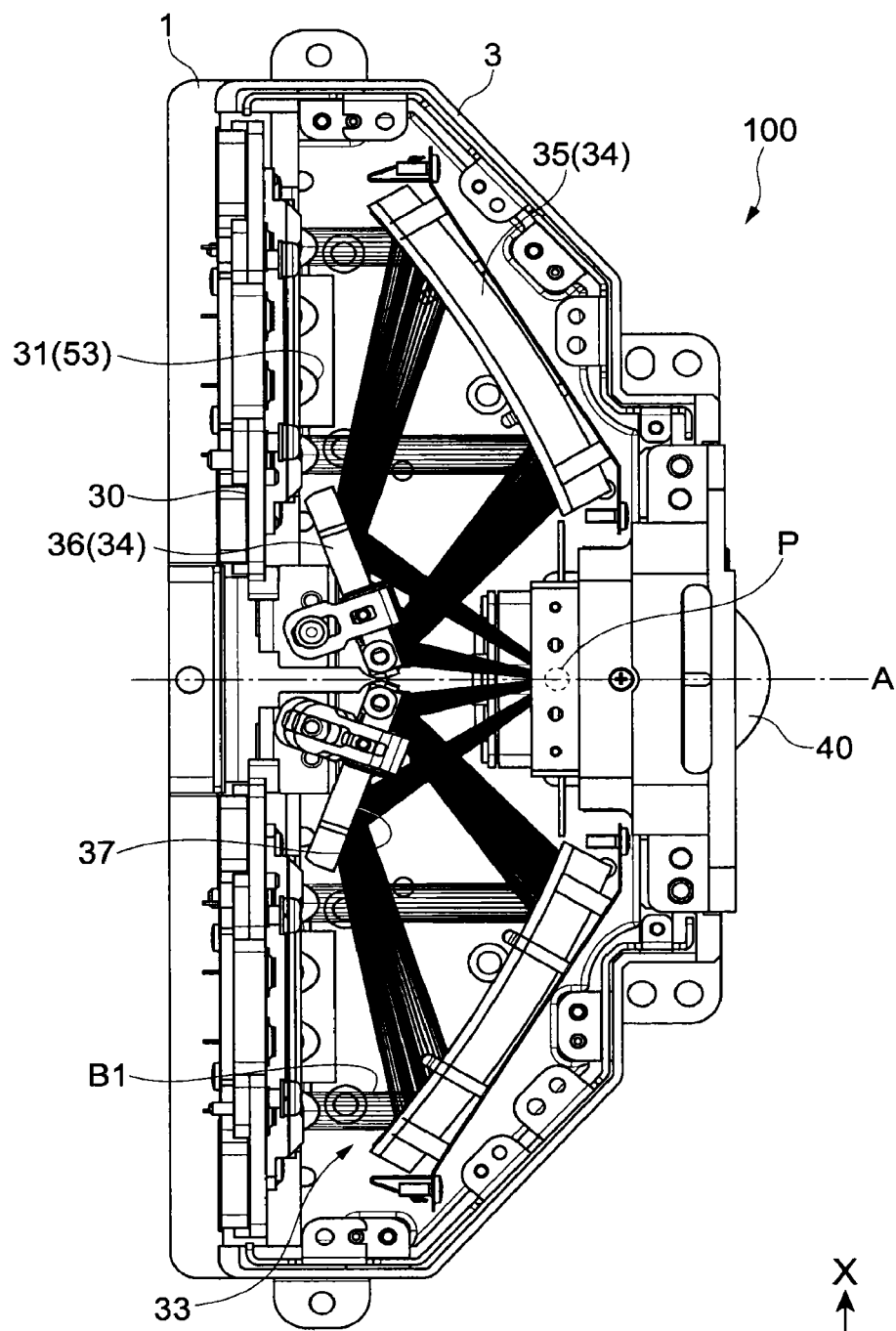
FIG. 5 is a plan view of the light source section shown in FIG. 4 when viewed from above.
Figure 6:
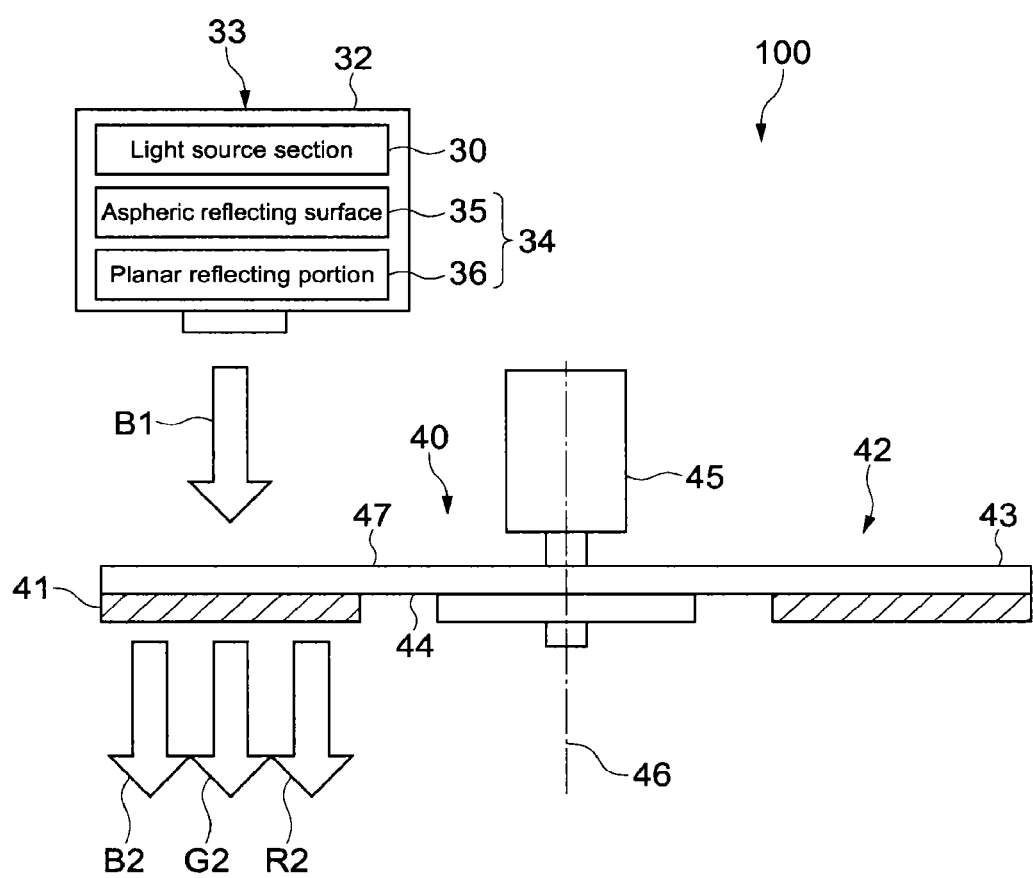
FIG. 6 is a schematic configuration view for describing light output by the light source section.

FIG. 5 is a plan view of the light source section 100 shown in FIG. 4 when viewed from above. In FIG. 5, the illustration of the support portions 32 is omitted. FIG. 6 is a schematic configuration view for describing light output by the light source section 100.

Each of the light collecting units 33 includes the light source unit 30, the light collecting optical system 34, and the support portion 32. The light source unit 30 includes the plurality of laser light sources 31. The light collecting optical system 34 collects the blue laser light B1 to a predetermined point P, the blue laser light B1 being the output light from the plurality of laser light sources 31. The support portion 32 supports the light source unit 30 and the light collecting optical system 34 as one unit.

The plurality of laser light sources 31 are blue laser light sources capable of oscillating the blue laser light B1 having a peak wavelength of an emission intensity within a wavelength range of 400 nm to 500 nm, for example. The plurality of laser light sources 31 correspond to one or more solid-state light sources that are capable of outputting light in a predetermined wavelength range as output light. Other light sources such as an LED (light-emitting diode) may be used as the solid-state light source. Further, the light in the predetermined wavelength range is also not limited to the blue laser light B1.

The light collecting optical system 34 collects the blue laser light B1, which is output from the plurality of laser light sources 31, onto a phosphor 41 from the rear side of the phosphor unit 40. The light collecting optical system 34 of this embodiment includes an aspheric reflecting surface 35 and a planar reflecting portion 36. The aspheric reflecting surface 35 reflects and collects the output light from the plurality of laser light sources 31.

The planar reflecting portion 36 reflects the light from the plurality of laser light sources 31, which is reflected on the aspheric reflecting surface 35, to the phosphor 41. The planar reflecting portion 36 includes a planar reflecting surface 37 as a reflecting surface that reflects the light from the plurality of laser light sources 31, and reflects the light to the phosphor 41 using the planar reflecting surface 37. Consequently, the blue laser light B1 from the plurality of laser light sources 31 is collected to the predetermined point P on the phosphor 41 of the phosphor unit 40.

The support portion 32 described above supports the light source unit 30, the aspheric reflecting surface 35, and the planar reflecting portion 36 as one unit. If those components can be integrally supported as one unit, the shape or size of the support portion 32 is not limited. Typically, in order to prevent the blue laser light B1 from being leaked to the outside, the support portion 32 having a housing shape is used. Consequently, the use efficiency of the blue laser light B1 is improved.

A phosphor wheel 42 shown in FIG. 6 is provided inside the phosphor unit 40. The phosphor wheel 42 includes a disk-like substrate 43 and a phosphor layer 41. The substrate 43 transmits the blue laser light B1. The phosphor layer 41 is provided on an arrangement surface 44 of the substrate 43. A motor 45 that drives the phosphor wheel 42 is connected to the center of the substrate 43. The phosphor wheel 42 has a rotation axis 46 on a normal line passing through the center of the substrate 43 and is provided to be rotatable about the rotation axis 46.

The rotation axis 46 of the phosphor wheel 42 is provided such that the extending direction of the rotation axis 46 is the same direction as the optical axis A passing through substantially the center of the phosphor unit 40. Further, the rotation axis 46 is arranged at a position different from the optical axis A such that the predetermined point P of the phosphor layer 41 is located at substantially the center of the phosphor unit 40 (on the optical axis A). As shown in FIG. 5, the light collecting unit 33 collects the blue laser light B1 to the predetermined point P arranged at substantially the center of the phosphor unit 40.

As shown in FIG. 6, the phosphor wheel 42 is arranged such that a main surface 47, which is one of the two main surfaces of the substrate 43 and on which the phosphor layer 41 is not provided, faces the light collecting unit 33 side. Further, the phosphor wheel 42 is arranged such that a focal position of the blue laser light B1 collected by the light collecting unit 33 matches the predetermined point on the phosphor layer 41.

The phosphor layer 41 corresponds to a light emitter that is excited by the light from the plurality of laser light sources 31 and emits visible light in a wavelength range longer than that of the light from the plurality of laser light sources 31. In this embodiment, the phosphor layer 41 contains a fluorescent substance that emits fluorescence by being excited by the blue laser light B1 having a center wavelength of approximately 445 nm. The phosphor layer 41 converts part of the blue laser light B1, which is output by the plurality of laser light sources 31, into light in a wavelength range including a range from the red to green wavelength ranges (that is, yellow light) and then outputs the resultant light.

As the fluorescent substance contained in the phosphor layer 41, for example, a YAG (yttrium, aluminum, garnet)-based phosphor is used. It should be noted that the type of a fluorescent substance, a wavelength range of excited light, and a wavelength range of the visible light generated by excitation are not limited.

Further, the phosphor layer 41 transmits part of the excitation light while absorbing part of the excitation light, and thus the phosphor layer 41 can also output the blue laser light B1 output from the plurality of laser light sources 31. Consequently, the light output from the phosphor layer 41 is white light obtained by combination of the blue excitation light and the yellow fluorescence. In order to transmit the part of the excitation light as described above, the phosphor layer 41 may contain filler particles as particulate substance having light transparency, for example.

By the rotation of the substrate 43 by the motor 45, the laser light sources 31 apply the excitation light to the phosphor layer 41 while an application position on the phosphor layer 41 is relatively moved. Consequently, white light containing blue laser light B2, which has passed through the phosphor layer 41, and green light G2 and red light R2 serving as visible light from the phosphor layer 41 is output as combined light by the phosphor unit 40. By the rotation of the phosphor wheel 42, deterioration due to the excitation light applied to the same position of the phosphor layer 41 for a long period of time can be avoided.

The phosphor unit 40 corresponds to an output section in this embodiment. It should be noted that the configuration of the phosphor unit 40 is not limited, and for example, the phosphor wheel 42 may not be used. For example, the phosphor layer 41 may be held by another holding portion, and blue laser light from the light collecting unit 33 may be collected thereto.

Figure 7:
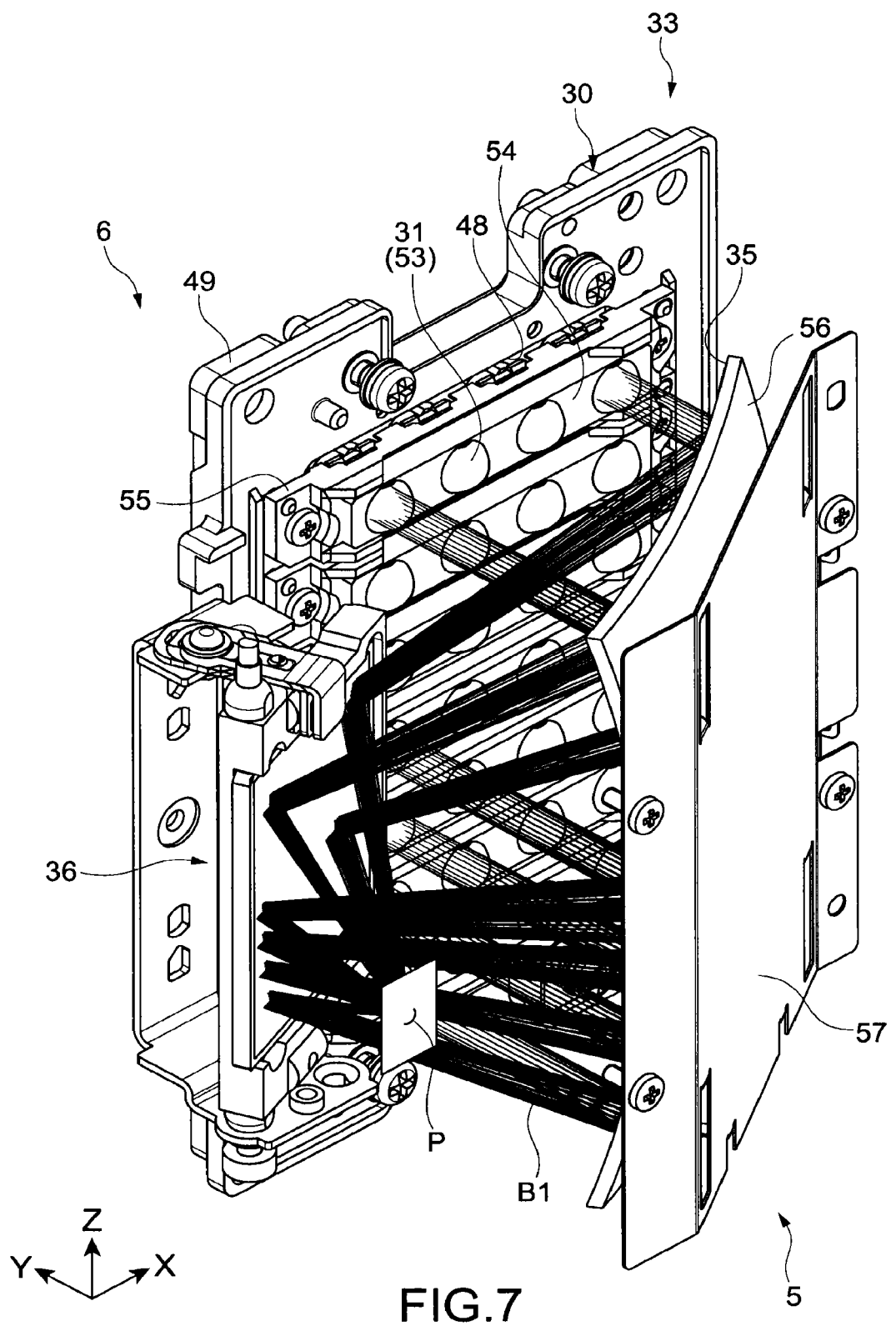
FIG. 7 is a perspective view showing a configuration example of a light collecting unit.
Figure 8:
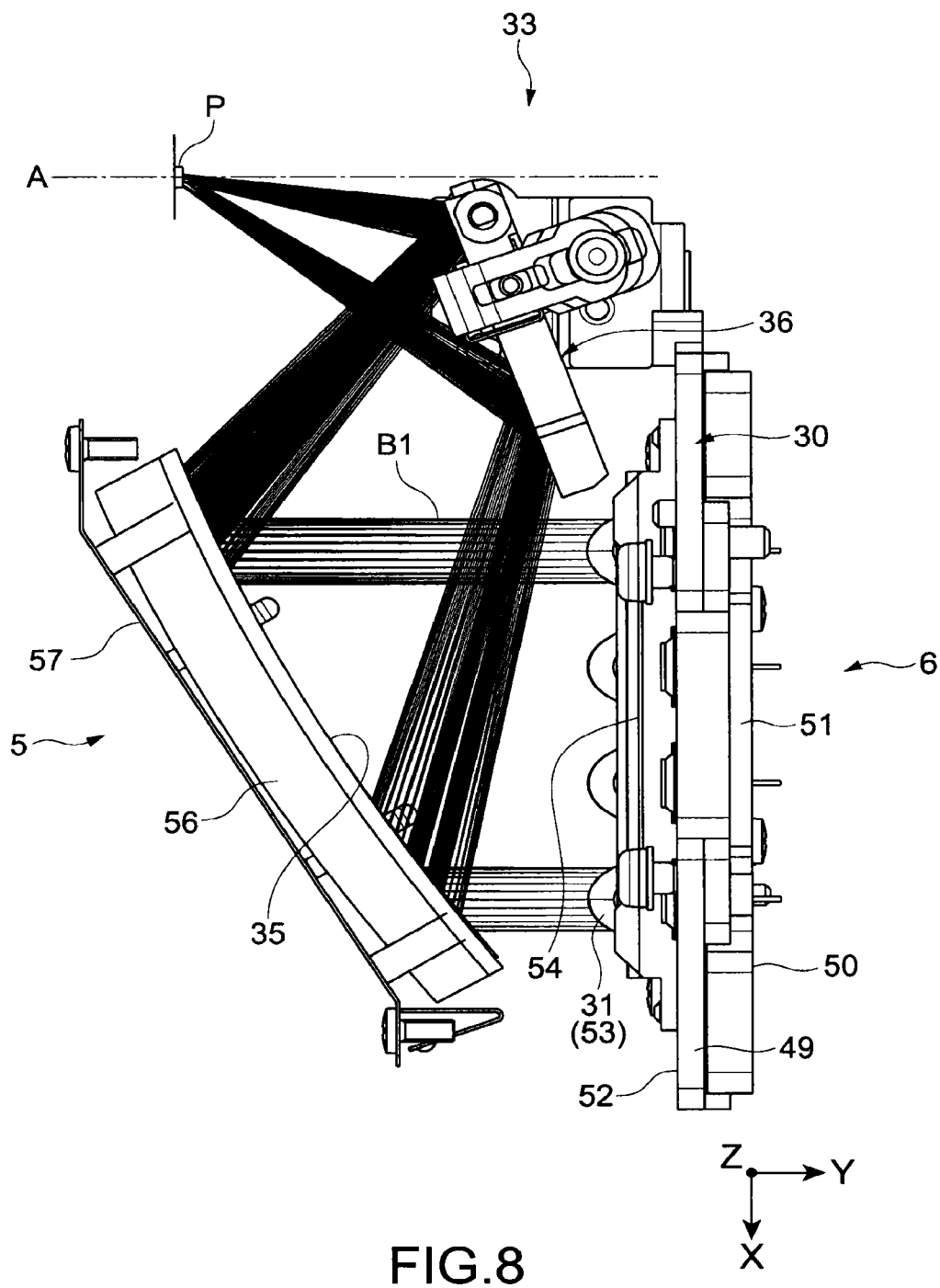
FIG. 8 is a plan view of the light collecting unit shown in FIG. 7 when viewed from above.

FIG. 7 is a perspective view showing a configuration example of the light collecting unit 33. In FIG. 7, the illustration of the support portion 32 is omitted. FIG. 8 is a plan view of the light collecting unit 33 shown in FIG. 7 when viewed from above.

As shown in FIG. 7, in this embodiment, a laser light source array including 28 laser light sources 31 is used as the light source unit 30. The light source unit 30 includes a plate-like frame 49 in which an opening 48 is formed. A mount substrate 51 (such as PCB) onto which the plurality of laser light sources 31 are mounted is arranged on a rear surface 50 of the frame 49 (on the surface on the rear side 6). The plurality of laser light sources 31 output the blue laser light B1 along the same direction as the optical-axis direction of the optical axis A toward the front side 5 via the opening 48 of the frame 49. The plurality of laser light sources 31 are arranged in a matrix of four in the horizontal direction (x-axis direction) by seven in the height direction (z-axis direction) of the light source section 100.

On the front surface 42 of the frame 49 (on the surface on the front side 5), 28 collimator lenses 53 are arranged to correspond to the positions of the plurality of laser light sources 31. The collimator lens 53 is a rotation symmetric, aspheric lens and converts the blue laser light B1 output from each laser light source 31 into a substantially parallel light flux. In this embodiment, a lens unit 54 is used, in which four collimator lenses 53 linearly arranged are integrally formed. The seven lens units 54 are arrayed along the height direction. The lens unit 54 is held with a holding member 55 that is fixed to the frame 49. It should be noted that the collimator lenses 53 are described as the laser light sources 31 in the figures in some cases.

The configuration of the light source unit 30 is not limited. For example, the frame 49 may not be used. The number of laser light sources 31, the arrangement thereof, the configuration of the collimator lens 53, and the like are also not limited. For example, a collimator lens may be arranged for each laser light source 31 without using the lens unit 54. Alternatively, light fluxes from the plurality of laser light sources 31 may be collected by one collimator lens and converted into a substantially parallel light flux. It should be noted that the figures show part of the light fluxes of the blue laser light B1 output from the plurality of laser light sources 31 (collimator lenses 53).

On the front side 5 of the plurality of laser light sources 31, a reflecting member 56 including the aspheric reflecting surface 35 is arranged. The reflecting member 56 is arranged such that the aspheric reflecting surface 35 is opposed to the plurality of laser light sources 31. The aspheric reflecting surface 35 is arranged obliquely with respect to a planar direction (x-z plane direction) of the arrangement surface 52 on which the plurality of laser light sources 31 are arranged. Consequently, the blue laser light B1 is reflected toward the planar reflecting portion 36. As the reflecting member 56, for example, a reflective mirror is used.

The aspheric reflecting surface 35 is typically a mirror-like concave reflecting surface, and the shape thereof is designed so as to reflect and collect the blue laser light B1 from the plurality of laser light sources 31. Further, the aspheric reflecting surface 35 may be a rotation symmetric, aspheric surface or a free-form surface having no axis of rotational symmetry. The shape of the aspheric reflecting surface 35 is set appropriately based on the positions of the plurality of laser light sources 31, a direction in which light is reflected, and a position at which light is collected, the level of the light flux of the laser light B1 input to the aspheric reflecting surface 35, an incident angle, and the like. The material of the reflecting member 56 is not limited, and a metal material and glass are used therefor, for example.

The outer shape or size of the reflecting member 56 can be appropriately set in accordance with the size of an area to which the blue laser light B1 is applied. For example, a substantially rectangular reflecting member 56 may be used. Alternatively, a reflecting member 56 having a triangular shape or another multangular shape, and the like may be used. Consequently, compared with the case where a light collecting lens is used to collect the light from the plurality of laser light sources 31, the outer shape of the reflecting member 56 can be appropriately adjusted to be made smaller. As a result, it is possible to produce a compact light collecting optical system 34 and suppress an increase in size of the light source section 100.

As shown in FIG. 8, the reflecting member 56 is supported by a support member 57. The support member 57 is fixed to the support portion 32 by screw clamp. Consequently, the reflecting member 56 is supported by the support portion 32.

Figure 9:
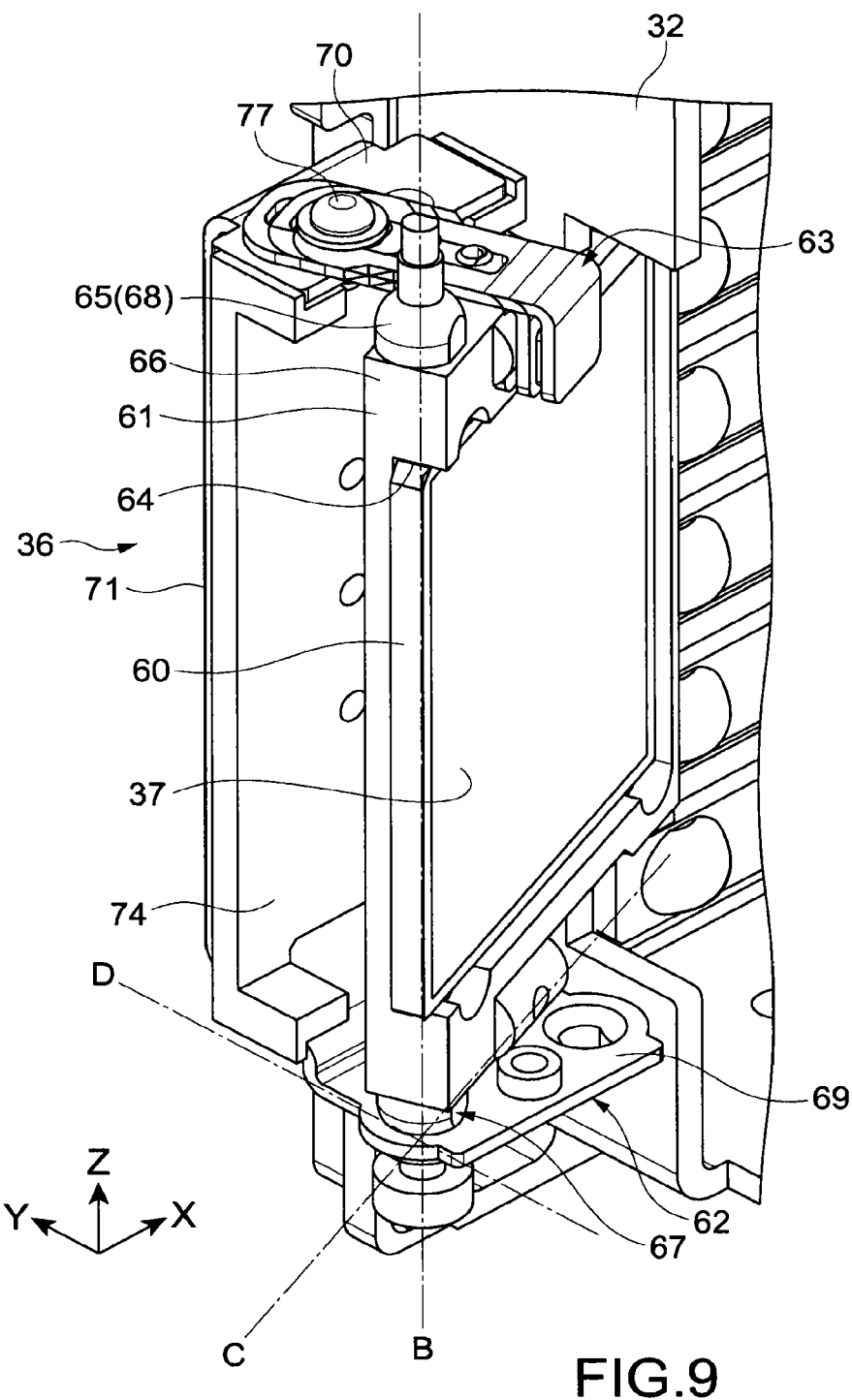
FIG. 9 is an enlarged view of a planar reflecting portion supported by a support portion.

FIG. 9 is an enlarged view of the planar reflecting portion 36 supported by the support portion 32. The planar reflecting portion 36 includes a planar reflecting member 60 including the planar reflecting surface 37. The planar reflecting surface 37 reflects the blue laser light B1, which is reflected on the aspheric reflecting surface 35, to the predetermined point P of the phosphor layer 41. Typically, the planar reflecting surface 37 is a mirror surface. As the planar reflecting member 60, for example, a reflective mirror is used. The material of the planar reflecting member 60 is not limited, and a metal material and glass are used therefor, for example.

Further, the planar reflecting portion 36 includes a member holding portion 61, a support frame 62, and a coupling portion 63. The member holding portion 61 holds the planar reflecting member 60. The support frame 62 supports the lower portion of the member holding portion 61 so as to be rotatable and tiltable. The coupling portion 63 couples the member holding portion 61 and the support frame 62 to each other on the upper portion side of the member holding portion 61.

As shown in FIG. 9, the member holding portion 61 has a plate shape and includes a concave portion 64 that is formed on an almost entire area of one surface thereof. The plate-like planar reflecting member 60 is fitted into the concave portion 64. The member holding portion 61 is vertically provided along the height direction (z-axis direction). A normal direction of the surface on which the concave portion 64 is formed, that is, a normal direction of the planar reflecting surface 37 is a direction orthogonal to the z axis.

Shaft portions 65 extending in the z-axis direction are formed at end portions of the member holding portion 61. The shaft portions 65 are formed integrally with the member holding portion 61, and for example, when the shaft portions 65 rotate, the member holding portion 61 also rotates. Therefore, the planar reflecting member 60 held by the member holding portion 61 also moves integrally with the shaft portions 65. In other words, the member holding portion 61 holds the planar reflecting surface 37 integrally with the shaft portions 65.

As shown in FIG. 9, the shaft portions 65 are formed at the upper and lower portions of the member holding portion 61 so as to be arranged linearly. At the upper and lower portions of the member holding portion 61, attachment portions 66 are formed. The shaft portions 65 are formed on the attachment portions 66. The attachment portions 66 formed at the upper and lower portions have the same shape. The shaft portions 65 formed at the upper and lower portions have the same shape.

One of the two shaft portions 65 is inserted into a shaft support hole 67 that is formed in the support frame 62. The other shaft portion 65 is used as an operation portion 68 that is operated when an angle of the planar reflecting surface 37 is adjusted. The coupling portion 63 is attached to the attachment portions 66 on the operation portion 68 side. For example, the shaft portion 65 to be inserted into the shaft support hole 67 is appropriately selected based on a position at which the planar reflecting surface 37 is arranged, a design of the light collecting unit 33, and the like.

When the member holding portion 61 is formed, the shaft portions 65 having the same shape are formed at the upper and lower portions of the member holding portion 61. In other words, since the shaft portion 65 and the operation portion 68 are formed into the same shape without discriminating therebetween, manufacturing costs of the member holding portion 61 can be reduced. Further, since the shaft portion 65 to be inserted into the shaft support hole 67 can be selected, the degree of freedom on the attachment of the member holding portion 61 can be increased.

The support frame 62 includes a lower support portion 69, an upper support portion 70, and a coupling frame 71 that couples those lower support portion 69 and upper support portion 70. The lower support portion 69 and the upper support portion 70 are arranged so as to be opposed to each other in the z-axis direction at positions substantially equal to the lower portion and the upper portion of the member holding portion 61, respectively. The coupling frame 71 extends along the z-axis direction and couples the lower support portion 69 and the upper support portion 70.

The shaft support hole 67 that supports the shaft portion 65 of the member holding portion 61 is formed in the lower support portion 69. The shaft portion 65 is inserted into the shaft support hole 67, and thus the member holding portion 61 is supported so as to be rotatable and tiltable. For example, as the shaft support hole 67, a hole having an elongated circular shape and short-axis and long-axis directions is formed. A circular-shaped insertion shaft having a diameter that is substantially the same as the size of the short-axis direction is inserted into the shaft support hole 67 having the elongated circular shape. The insertion shaft is inserted so as to be rotatable with respect to the shaft support hole 67 and tiltable in the long-axis direction. For example, by such a configuration, a biaxial drive mechanism is achieved, the biaxial drive mechanism including a rotary drive system in which the shaft portion 65 (axis B) is used as a rotation axis, and a rotary drive system (tilt drive system) in which an axis C with the shaft support hole 67 being as a reference is used as a rotation axis. Consequently, in the rotation direction and the tilt direction of the shaft portion 65, an angle of the planar reflecting surface 37 can be adjusted.

It should be noted that the configuration for supporting the shaft portion 65 to be rotatable and tiltable is not limited to the configuration above, and any configuration may be adopted. Further, the materials of the support frame 62 including the lower support portion 69, the member holding portion 61 including the shaft portions 65, and the like are also not limited, and metal and plastics may be appropriately used therefor, for example.

As shown in FIG. 9, the support frame 62 is supported by a frame support portion 74. The frame support portion 74 is included in the support portion 32 that supports the planar reflecting portion 36 and the like as one unit. In this embodiment, the support frame 62 is supported so as to be movable with respect to the frame support portion 74 in the front-back direction (y-axis direction) of the light source section 100. When the support frame 62 is moved in the y-axis direction, the member holding portion 61 and the support frame 62 are integrally moved. Consequently, the position of the planar reflecting surface 37 is adjusted.

The configuration of a movement mechanism for making the support frame 62 to be movable is not limited. For example, guide portions or the like that guide the support frame 62 are formed at the upper and lower portions of the frame support portion 74. Alternatively, a movement mechanism may be configured by appropriately using a spring member or the like that exerts an elastic force in a movement direction. In addition thereto, any configuration may be adopted. By the movement mechanism, a linear drive mechanism with an axis D being as a drive axis is achieved.

The position and angle of the planar reflecting surface 37 are adjusted with an screw 77 being temporarily jointed. By the rotation of the operation portion 68, the angle of the planar reflecting surface 37 about the shaft portion 65 is adjusted. Consequently, the position of the light collecting point P in the horizontal direction can be adjusted. Further, the operation portion 68 is moved in the front-back direction so as to tilt the shaft portion 65, and thus the tilt of the planar reflecting surface 37 can be adjusted. Consequently, the position of the light collecting point P in the height direction can be adjusted. Further, the position of the support frame 62 in the front-back direction is adjusted, and thus a focus position of the light collecting point P can be adjusted. When the adjustments are finished, the screw 77 is fastened, so that the coupling portion 63 and the upper support portion 70 are fixed to the frame support portion 74.

In the light source section 100 according to this embodiment, the two light collecting units 33 are arranged at two respective positions that are symmetric with respect to the axis A passing the phosphor layer 41. With such a configuration, the number of laser light sources 31 is doubled, that is, 56 pieces, and thus a high luminance of white light to be output from the phosphor layer 41 can be achieved.

For example, when light from the 56 laser light sources 31 is intended to be collected with a light collecting lens, a huge lens is necessary. In this embodiment, however, since the light collecting units 33 using the aspheric reflecting surfaces 35 are used, an increase in size of the light source section can be suppressed. Therefore, a high luminance can be achieved while an increase in size of the apparatus is suppressed.

It should be noted that the blue laser light B1 from the two light collecting units 33 may be collected at one light collecting point P. On the other hand, a light collecting point of each light collecting unit 33 may be set at a different position on the phosphor layer 41. Consequently, the deterioration of the phosphor layer 41 can be suppressed.

In this embodiment, since the optical-axis direction of the white light W from the phosphor unit 40 and the output direction of the blue laser light B1 from the plurality of laser light sources 31 are the same direction, the handling of the blue laser light B1 is facilitated. For example, in the case where the assembly of the light source section 100, the adjustment of each member, and the like are performed, the traveling direction of the blue laser light B1 can be easily grasped. Therefore, measures for safety such as prevention of the unexpected application of laser light and the like can be easily performed.

Further, in this embodiment, the aspheric reflecting surface 35 is used for collecting light to the phosphor 41. Consequently, the light source apparatus 100 can be made compact. For example, even in the case where the number of laser light sources 31 is increased so as to achieve a high luminance, the size of the light collecting optical system 34 can be suppressed. As a result, it is possible to achieve a high luminance while suppressing the increase in size of the apparatus. Further, using the aspheric reflecting surface 35 can easily achieve a structure corresponding to a necessary luminance and shape.

Further, used in this embodiment is the planar reflecting member 60 that reflects the blue laser light B1 toward the phosphor 41, the blue laser light B1 being reflected on the aspheric reflecting surface 35. With such a reflecting member, the degree of freedom on the design of the light collecting optical system 34 can be increased. As a result, the downsizing, a desired shape, and the like of the light source section 100 can be achieved.

Further, in this embodiment, the plurality of laser light sources 31 and the light collecting optical system 34 are supported as one unit by the support portion 32. Therefore, a plurality of light collecting units 33, each of which is in the form of unit, can be easily arranged. In other words, it is possible to correspond to a multi-unit configuration. Since the shape and the like of the light collecting unit 33 can also be flexibly changed, it is also possible to appropriately combine the light collecting units 33 having various configurations to correspond to various specifications.

With such a light source section 100, the downsizing of the image display apparatus 500 can be achieved. Further, appropriate setting of the shape and the like of the light source section 100 can make the designs of the outer shape of the image display apparatus 500 to be improved, for example.

[Sensor Mechanism]

The sensor mechanism according to this embodiment will be described. As described above, the sensor mechanism 520 includes the environmental temperature sensor (first sensor) 521, the light source temperature sensor (second sensor) 522, and the optical system temperature sensor (third sensor) 523.

Figure 10:
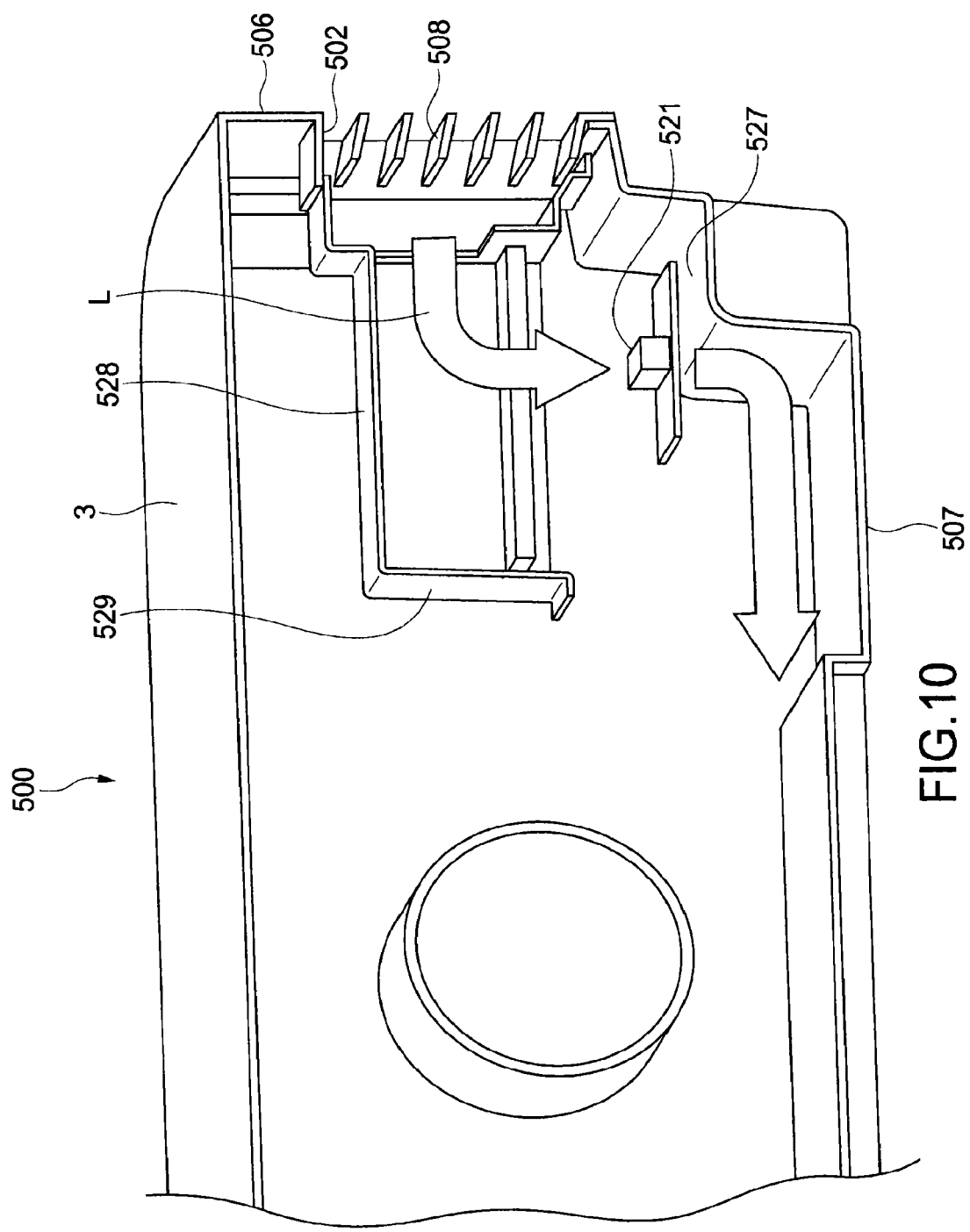
FIG. 10 is a schematic view showing an example of a location at which an environmental temperature sensor is arranged.

FIG. 10 is a schematic view showing an example of a location at which the environmental temperature sensor 521 is arranged. The environmental temperature sensor 521 is arranged in the vicinity of the inlet 502 and measures a temperature of external air L as external temperature, the external air L being taken in from the inlet 502. In this embodiment, a step-like placement surface 527 is formed at a location that is in the vicinity of the inlet 502 inside the housing 3 and is below the inlet 502. The environmental temperature sensor 521 is arranged on the placement surface 527.

As shown in FIG. 10, a flow channel member 528 is formed inside the housing 3. The flow channel member 528 horizontally extends in a direction toward the inside from the inlet 502. A folded portion 529 is formed at the tip portion of the flow channel member 528. The folded portion 529 is folded downward. Therefore, the external air L taken in from the inlet 502 travels downward toward the environmental temperature sensor 521 and to the bottom surface portion 507 of the housing 502 after passing above the environmental temperature sensor 521, and to the inside of the housing 3 along the bottom surface portion 507 of the housing 502. In other words, the environmental temperature sensor 521 is arranged on the flow channel of the external air L that is taken in from the inlet 502. Consequently, the external temperature can be measured with high accuracy.

It should be noted that the position at which the environmental temperature sensor 521 is arranged is not limited as long as the position is in the vicinity of the inlet 502 that takes in the external air L. In this embodiment, as shown in FIG. 1, the environmental temperature sensor 521 is arranged on the front surface portion 504 side of the housing 3, but the position is not limited thereto. The environmental temperature sensor 521 only needs to be appropriately arranged at a position at which an external temperature can be measured, based on the shape or size of the inlet 502, the internal structure that defines the flow channel for the external air L, and the like. For example, if the external temperature can be measured, the arrangement location may be set at a position that is different from a position on the flow channel for the taken-in external air L. Further, if the environmental temperature sensor 521 is arranged at a position inside the housing 3, at which there is no heat generating component around, an accurate temperature measurement can be performed.

In FIG. 1, the environmental temperature sensor 521 is arranged in the vicinity of the inlet 502 that is formed in one of the two side surface portions 506a and 506b. As a matter of course, the environmental temperature sensor 521 may be arranged in the vicinity of the inlet 502 formed in the side surface portion 506b on the opposite side. Alternatively, two environmental temperature sensors 521 may be arranged in the vicinity of both of the side surface portions 506a and 506b. Two or more environmental temperature sensors 521 may be arranged.

As a temperature sensor that measures temperature, any sensor including widely-known ones may be used. The same holds true for the light source temperature sensor 522 and the optical system temperature sensor 523 that will be described later.

Based on the external temperature measured by the environmental temperature sensor 521, the control section 525 controls the output of the plurality of laser light sources 31. In this embodiment, the output of the plurality of laser light sources 31 is decreased in accordance with the rise of the measured external temperature. Specifically, in the case where a predetermined temperature is set as a first reference temperature and the external temperature is higher than the first reference temperature, the output is decreased in accordance with a temperature difference between the external temperature and the first reference temperature. Consequently, in accordance with the external temperature, a luminance of the blue laser light B1 from the plurality of laser light sources 31 is properly controlled.

Figure 11:
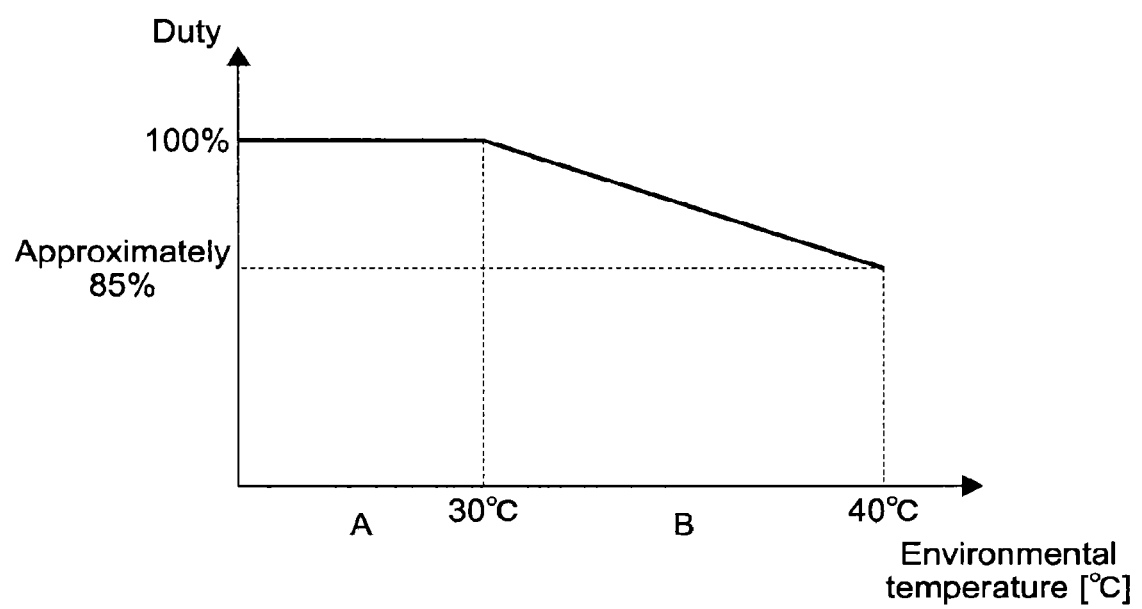
FIG. 11 is a graph showing an example of output control of a plurality of laser light sources by a control section.

FIG. 11 is a graph showing an example of output control of the plurality of laser light sources 31 by the control section 525. In the example shown here, the first reference temperature is set to 30° C. Therefore, in the case where the external temperature is lower than 30° C., the laser light is output by the output of 100% (see the part A of the graph). In the case where the external temperature is higher than 30° C., the control to supress the output of the laser light is started. In the example shown in FIG. 11, in the case where the temperature rises from 30° C. to 40° C., the luminance of approximately 15% is decreased, and the laser light is output by the output of approximately 85% (see part B of the graph). It should be noted that how much the luminance is decreased in accordance with the temperature rise is not limited, and may be appropriately set based on a usage environment, heat resistance of components within the apparatus, and the like.

In such a manner, the output of the plurality of laser light sources 31 is controlled based on the external temperature measured by the environmental temperature sensor 521. Consequently, a proper operation corresponding to a change mainly in external temperature environment can be performed. For example, in the case where the external temperature rises from 25° C. to 40° C., normally, the temperatures of air and members inside the housing 3 also rise by approximately 15° C. However, decreasing the output of the laser light sources 31 can sufficiently suppress the temperature rise of the laser light sources 31 and another optical element member of the image generation section 200. It should be noted that the control of fans that has been known in the past (control to increase a voltage of fans when the temperature becomes high) may be performed in parallel. Consequently, it is possible to sufficiently suppress a temperature rise. By suppression of the temperature rise of components in a high-temperature environment, the components can be prevented from being deteriorated by heat. As a result, the longer operating life of optical components can be achieved. In such a manner, by the arrangement of the environmental temperature sensor 521 that can monitor the external temperature, a proper operation associated with the rise of the external temperature can be performed.

Figure 12:
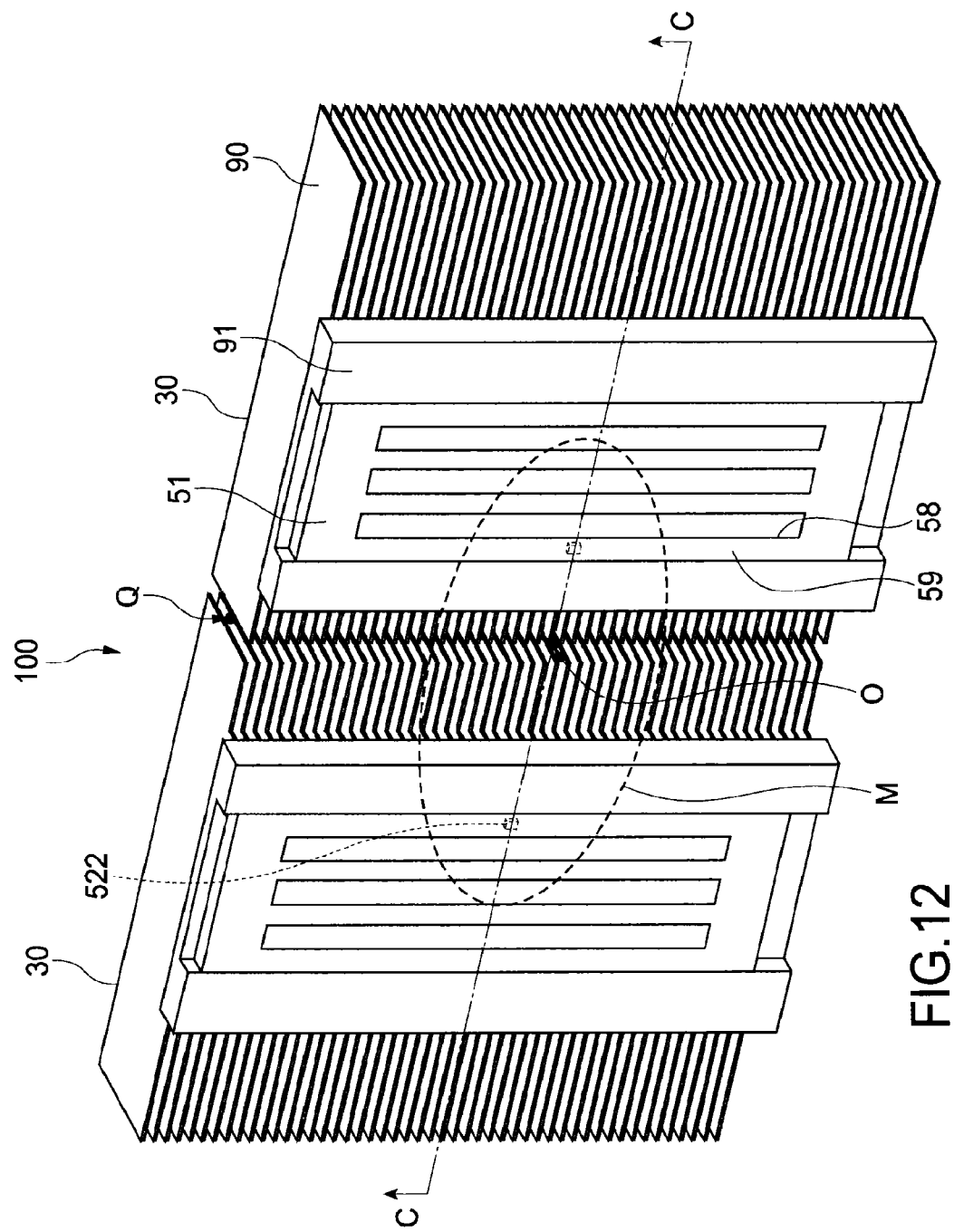
FIG. 12 is a schematic view showing an example of a location at which a light source temperature sensor is arranged.
Figure 13:
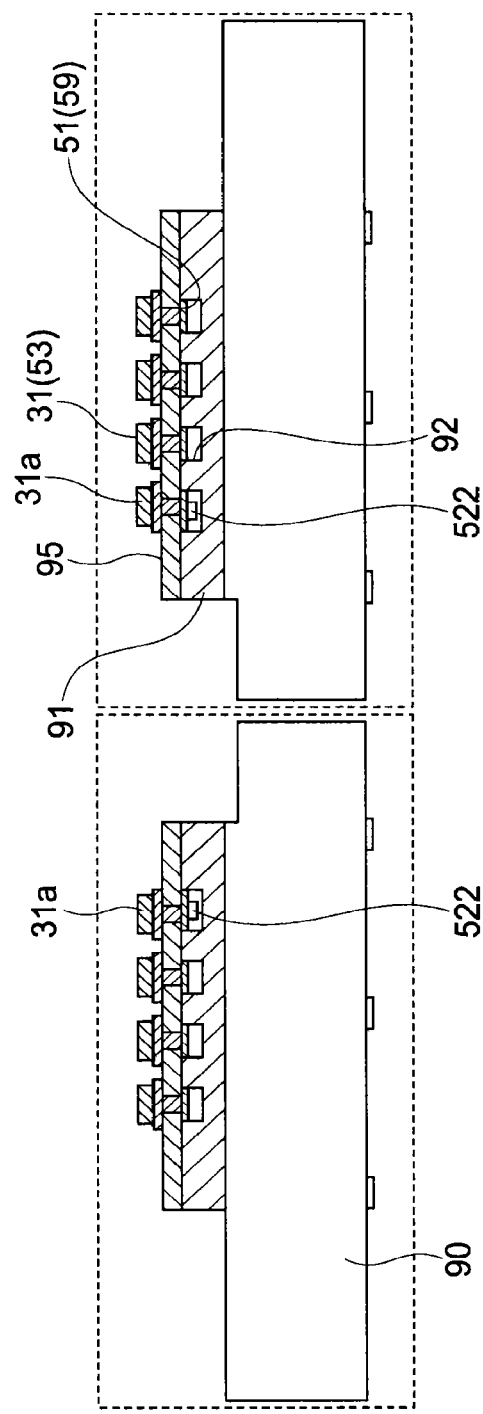
FIG. 13 is a schematic view showing an example of the location at which the light source temperature sensor is arranged.

FIGS. 12 and 13 are each a schematic view showing an example of a location at which the light source temperature sensor 522 is arranged. FIG. 12 is a schematic view showing a connection portion 91 of the heat sink 90 and a mount substrate 51 attached thereto. The frame 49 and the like of the light source section 100 are connected to the connection portion 91 of the heat sink 90. It should be noted that FIG. 12 does not show the laser light sources 31 (collimator lenses 53) mounted to the mount substrate 51. FIG. 13 is a cross-sectional view taken along the line C-C of FIG. 12. FIG. 13 shows the mount substrate 51 attached to the connection portion 91 of the heat sink 90 and the plurality of laser light sources 31 mounted to the mount substrate 51.

As shown in FIG. 13, a plurality of concave portions 92 are formed in the connection portion 91. The plurality of concave portions 92 extend in the height direction and are arranged in the horizontal direction. As shown in FIG. 12, the mount substrate 51 having a plurality of slits 58 is attached so as to cover the concave portions 92. The mount substrate 51 is attached such that mount portions 59 between the slits 58 cover the concave portions 92. A heat spreader 95 is arranged on the mount substrate 51, and the plurality of laser light sources 31 are mounted onto the mount portions 59 of the mount substrate 51 via the heat spreader 95. A total of 28 laser light sources 31, which are arranged in a matrix of four in the horizontal direction by seven in the height direction, are arranged in each of the light source units 30.

The light source temperature sensors 522 are arranged in the respective light source units 30 and measure the temperatures of the plurality of laser light sources 31 as a light source temperature. In this embodiment, the light source temperature sensors 522 are arranged one by one in the respective light source units 30. The light source temperature sensors 522 are arranged in a center area M of an application area of the blue laser light B1 in the light source section 100. Assuming that an area in which the plurality of laser light sources 31 are arrayed is an application area, the center area M is an area located in the vicinity of the center O of the application area. In this embodiment, an area in which the 56 laser light sources 31 are arranged is the application area of the blue laser light B1, and a center area including the center O of the application area (i.e., area surrounded by a chain line of FIG. 12) is the center area M. The light source temperature sensors 522 are provided at positions included in the center area M.

As shown in FIG. 13, in this embodiment, the light source temperature sensors 522 are each provided at the center of the 28 laser light sources 31 of each light source unit 30 and on the opposite side of a laser light source, which is located on the adjacent light source unit 30 side, the mount substrate 51 being sandwiched between the light source temperature sensor 522 and the laser light source. In other words, each of the light source temperature sensors 522 is arranged on the rear side of a laser light source 31a, which is located at the end on the adjacent light source unit 30 side, among the laser light sources 31 in the center row (the fourth row from the top) in the matrix of four laser light sources 31 arranged in the horizontal direction by seven laser light sources 31 arranged in the height direction. The light source temperature sensor 522 is mounted on the rear side of the mount substrate 51, together with a circuit for driving the light source temperature sensor 522, and the like. In FIG. 12, the light source temperature sensors 522 on the rear side of the mount substrates 51 are illustrated by broken lines.

As shown in FIG. 12, the light source temperature sensors 522 of the respective light source units 30 are arranged at positions that are symmetric about the center O. Since the center area M of the light source section 100 is an area that has the highest temperature, when the sensors are symmetrically provided in the center area M, the maximum temperature of the light source section 100 can be measured with high accuracy. Therefore, a proper operation corresponding to the variation of the light source temperature can be made. Further, by the symmetric arrangement with the center O as a reference, the attachment of the light source temperature sensors 522 is facilitated. Further, since one light source temperature sensor 522 is arranged in each of the light source units 30, monitoring a representative temperature of each light source unit 30 can also be performed.

Depending on the number of light source units 30 or the way of arraying the light source units 30, the center area M varies. For example, it is assumed that one more light source unit 30 is arranged above the two light source units 30 shown in FIG. 12 and that the three light source units 30 are provided in such a positional relationship that the centers of the three light source units 30 form the vertexes of a regular triangle. In this case, the center O of the application area is a position of the center point of the regular triangle and corresponds to the vicinity of a point Q shown in FIG. 12. The light source temperature sensor 522 is provided on the rear side of a laser light source 31 that is the most proximate to the point Q. In such a manner, the light source temperature sensor 522 only needs to be arranged so as to be included in the center area M, depending on the number of light source units 30 or the array thereof. It should be noted that if the temperatures of the plurality of laser light sources 31 can be measured, the light source temperature sensor 522 may be arranged at a position that is not included in the center area M. Further, the position at which the light source temperature sensor 522 is provided is not limited to the position on the opposite side to the laser light source 31.

Additionally, the configuration to achieve low thermal resistance by the heat spreader 95 and the heat sink 90 is also not limited. For the low thermal resistance, grease may be used between the heat spreader 95 and the heat sink 90, or a heat radiation sheet, a phase change sheet, and the like may also be used.

The control section 525 controls the output of the plurality of laser light sources 31 based on the light source temperature measured by the light source temperature sensors 522. In this embodiment, the output of the plurality of laser light sources 31 is decreased in accordance with the decrease of the measured light source temperature. Specifically, in the case where a predetermined temperature is set as a second reference temperature and the external temperature is lower than the second reference temperature, the output is decreased in accordance with a temperature difference between the external temperature and the second reference temperature. Consequently, in accordance with the light source temperature, a luminance of the blue laser light from the plurality of laser light sources 31 is properly controlled.

Figure 14:
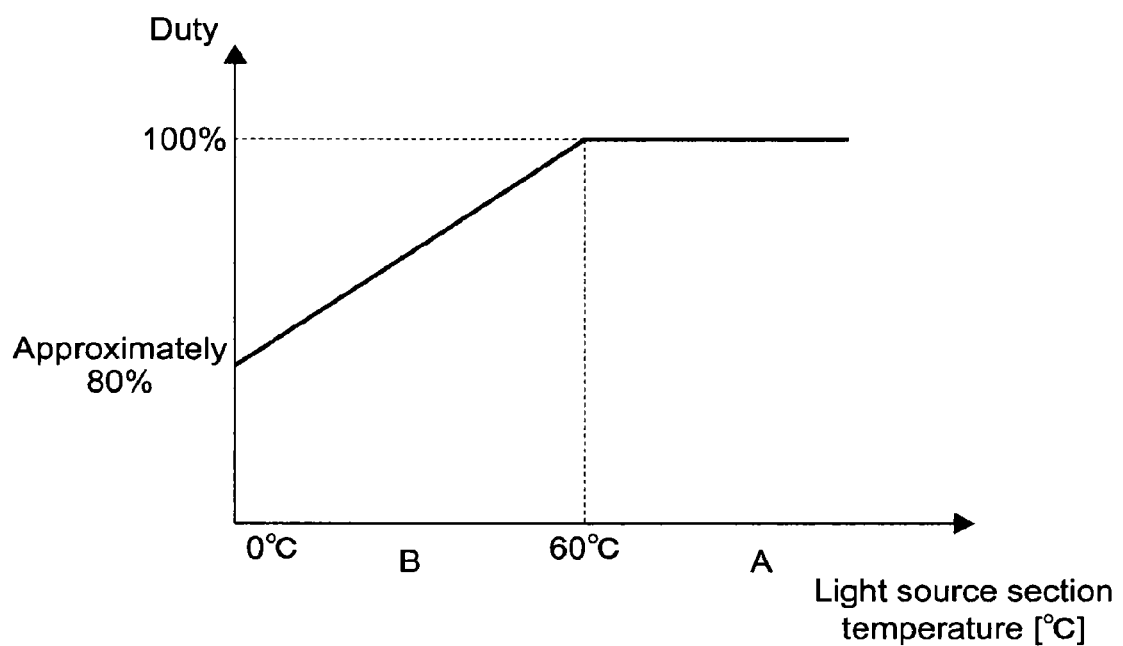
FIG. 14 is a graph showing an example of the output control of the plurality of laser light sources by the control section.

FIG. 14 is a graph showing an example of output control of the plurality of laser light sources 31 by the control section 525. In the example shown here, the second reference temperature is set to 60° C. Therefore, in the case where the light source temperature is higher than 60° C., this state is considered to be a state where the temperature reaches a recommended operating temperature, and the laser light is output by the output of 100% (see the part A of the graph). The recommended operating temperature may be set as a second reference temperature without change, or another temperature in the vicinity thereof may be set.

In the case where the light source temperature is lower than 60° C., the control to supress the output of the laser light is started. This includes both of a state where the light source temperature is decreased from the state higher than 60° C. and a state where the light source temperature does not reach 60° C. (for example, 60° C. as a recommended operating temperature) from the start of the operation. In the example shown in FIG. 14, in the case where the temperature is decreased from 60° C. to 0° C. (in the state where the light source temperature is 0° C.), the luminance of approximately 20% is decreased, and the laser light is output by the output of approximately 80% (see part B of the graph). It should be noted that how much the luminance is decreased in accordance with the temperature decrease, i.e., in accordance with a low-temperature state, is not limited, and may be appropriately set based on the output performance of the laser light sources 31, and the like.

When the light source temperature is low, the laser output of the laser light sources 31 becomes high, and by reception of light energy thereof, an optical element such as a PS converter may be deteriorated. Further, due to the heat generation of the laser light sources 31, the laser light sources 31 may also be deteriorated. In this embodiment, the output of the plurality of laser light sources 31 is controlled based on the light source temperature measured by the light source temperature sensors 522. Consequently, it is possible to prevent the laser light sources 31 or optical components of the image generation section 200 from being deteriorated due to an excessive light application in a low-temperature state where the light source temperature is low. As a result, the longer operating life of the laser light sources 31 and optical components can be achieved.

When a feedback is used so as to narrow down the output based on the measurement result of the light source temperature sensors 522, it is possible to prevent excessive light output from occurring and to perform control to be returned to a normal drive when the temperature reaches a temperature initially assumed. In the case where a surface light source arranged in a planar shape is configured by a plurality of partitions, the sensors may be arranged to be symmetric about the center portion in the whole assemble of the partitions. In such a manner, a proper operation corresponding to the variation in light source temperature can be made.

Figure 15A:
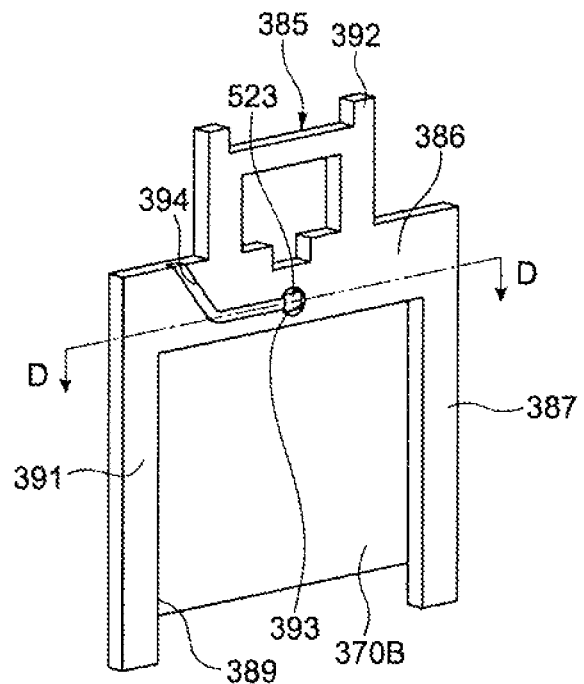
FIGS. 15A and 15B are schematic views showing an example of a location at which an optical system temperature sensor is arranged.
Figure 15B:
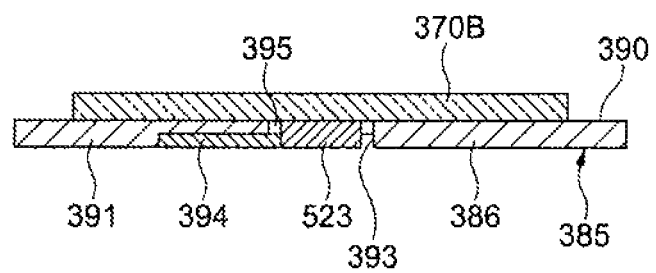

FIG. 15 is a schematic view showing an example of a location at which the optical system temperature sensor 523 is arranged. FIG. 15A is a schematic view showing an incident polarizing plate 370B shown in FIG. 2. FIG. 15B is a cross-sectional view taken along the line D-D of FIG. 15A.

The optical system temperature sensor 523 is arranged in the illumination optical system 220 and measures the temperature of the illumination optical system 220 as an optical system temperature. In this embodiment, the optical system temperature sensor 523 is provided to the incident polarizing plate 370B included in the blue optical system. Consequently, it is possible to highly accurately monitor the temperature rise by the blue light that is the shortest wavelength and has high energy, and the like. It should be noted that the arrangement location of the optical system temperature sensor 523 is not limited thereto. For example, the optical system temperature sensor 523 may be provided to the outgoing polarizing plate 380B that is another optical member of the blue optical system, and the like. Further, the optical system temperature sensor 523 may be provided to a polarizing plate or the like of the red optical system or the green optical system.

As shown in FIG. 15, a sensor holder 385 is attached to the incident polarizing plate 380B. The sensor holder 385 includes a main body portion 386 and two leg portions 387. The main body portion 386 extends in one direction. The two leg portions 387 extend from both the ends of the main body portion 386 in a direction orthogonal to the extending direction of the main body portion 386. The main body portion 386 and the two leg portions 387 form a notch portion 389. The incident polarizing plate 370B is fixed to a placement surface 390 of the main body portion 386 and the two leg portions 387 so as to cover the notch portion 389. In FIG. 15A, the placement surface 390 is on the far side on the plane, and a rear surface 391 on the opposite side of the placement surface 390 is illustrated.

Further, the sensor holder 385 includes a grip portion 392 on the opposite side to the leg portions 387 of the main body portion 386. Further, the sensor holder 385 includes a through-hole 393 and a wiring path 394. The through-hole 393 is formed on the rear surface 391 side of the main body portion 386. The wiring path 394 is formed so as to communicate with the through-hole 393. As shown in FIG. 15B, the optical system temperature sensor 523 is supported so as to come into contact with the incident polarizing plate 370B from the rear surface 391 side of the main body portion 386 via the through-hole 393. The optical system temperature sensor 523 is bonded to the incident polarizing plate 370B by an adhesive 395 or the like. Wiring for driving the optical system temperature sensor 523 and the like are attached along the wiring path 394 and electrically connected to the control section 525. It should be noted that the configuration and method for attaching the optical system temperature sensor 523 are not limited.

The control section 525 determines a state of the filter 511 based on the optical system temperature measured by the optical system temperature sensor 523. For example, in the case where the optical system temperature is higher than a predetermined temperature, the control section 525 determines a state where clogging or the like occurs and the filter 511 does not function properly. For example, in the case where the predetermined temperature is set as a third reference temperature and the optical system temperature is higher than the third reference temperature, an indication for the replacement of the filter 511 is output to an operating display or the like of the image display apparatus 500. Alternatively, an alarm or the like may be issued. Consequently, it is possible for a user to replace the filter 511 at a proper timing. Alternatively, in the case where the optical system temperature is higher than the third reference temperature, the operation of the image display apparatus 500 may be stopped. Consequently, it is possible to prevent the optical components and the like from being deteriorated due to the drive under an extremely-high-temperature condition.

When dirt and the like are accumulated in the filter 511, clogging or the like occurs and the pressure loss of the filter 511 increases. In such a case, the cooling performance by the fan mechanism decreases, and the temperature rise of the illumination optical system 220 and the deterioration of the optical members are advanced. As in this embodiment, when the state of the filter 511 is determined based on the optical system temperature measured by the optical system temperature, this makes it possible to highly accurately detect clogging or the like of the filter 511 and to prevent a thermal influence due to the deterioration of the filter 511 and the like.

As the control by the control section 525, various types of control may be set, in addition to those described above. For example, in the case where the optical system temperature exceeds a predetermined threshold value (for example, 50° C.), a message for the replacement of the filter 511 is output, and the output of fans is increased. After that, in the case where the optical system temperature exceeds the threshold value again, a message for the replacement of the filter 511 is output again, and the electric power source of the image display apparatus 500 is shut down after a predetermined period of time. Such control may also be executed.

The optical system temperature sensor 523 is preferentially arranged in an optical member on the optical path of the blue optical system in which a deterioration particularly progresses quickly. This makes it possible to forecast the operating life of the filter 511 with high accuracy and detect and notify the temperature rise within the device due to contamination of the filter at an early stage. Therefore, it is possible to prevent the temperature rising state within the device due to clogging from being continued and to suppress the deterioration of the optical member.

Hereinabove, in the image display apparatus 500 according to this embodiment, proper control is appropriately executed based on the external temperature measured by the environmental temperature sensor 521, the light source temperature measured by the light source temperature sensor 522, and the optical system temperature measured by the optical system temperature sensor 523. Consequently, it is possible to suppress the deterioration of an optical member and to achieve a longer operating life of the optical member.

<Other Embodiments>

The present technology is not limited to the embodiment described above, and other various embodiments can be achieved.

In the above description, the three sensors of the environmental temperature sensor, the light source temperature sensor, and the optical system temperature sensor are used. Of those, any one or two temperature sensors may be used to execute the control described above based on the temperature(s) measured by the sensor(s). In other words, if all of the three temperature sensors are not used, the effects of preventing the deterioration of an optical member and the like can be produced.

The configurations, arrangement locations, and the like of the light source section, the image generation section, and the projection section are not limited. It should be noted that the light source section 100 described above may be used as a light source apparatus according to this embodiment. In this case, the light source temperature sensor and the control section capable of controlling the output of the laser light source based on the light source temperature may configure a sensor section. Further, the image generation section 200 described above may be used as an optical unit according to this embodiment.

Figure 16A:
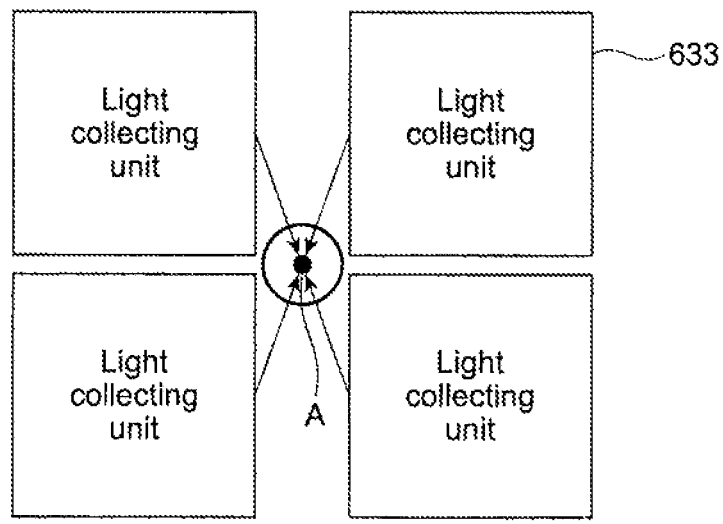
FIGS. 16A and 16B are schematic views showing another configuration example in which a plurality of light collecting units are arranged.

FIG. 16 is a schematic view showing another configuration example in which a plurality of light collecting units are arranged. For example, as shown in FIGS. 16A and B, four light collecting units 633 (733) may be arranged to be symmetric with respect to the optical axis A. In each of the light collecting units 633 (733), an appropriate adjustment is performed such that light is collected to a light collecting point on the optical axis A. The number of light collecting units to be arranged is not limited, and more light collecting units may be arranged.

In FIG. 16A, a surface having a rectangular shape in the planar shape is used as an arrangement surface on which the plurality of laser light sources are arranged. The planar shape of the arrangement surface is one viewed from an output direction of output light from the plurality of laser light sources. For example, in the light source unit 30 shown in FIG. 7, the planar shape of the plate-like frame 49 corresponds to the planar shape of the arrangement surface. As shown in FIG. 13, the outer shape viewed from the output direction of the light collecting unit 633 is also formed into a rectangular shape in accordance with the shape of the arrangement surface.

Figure 16B:
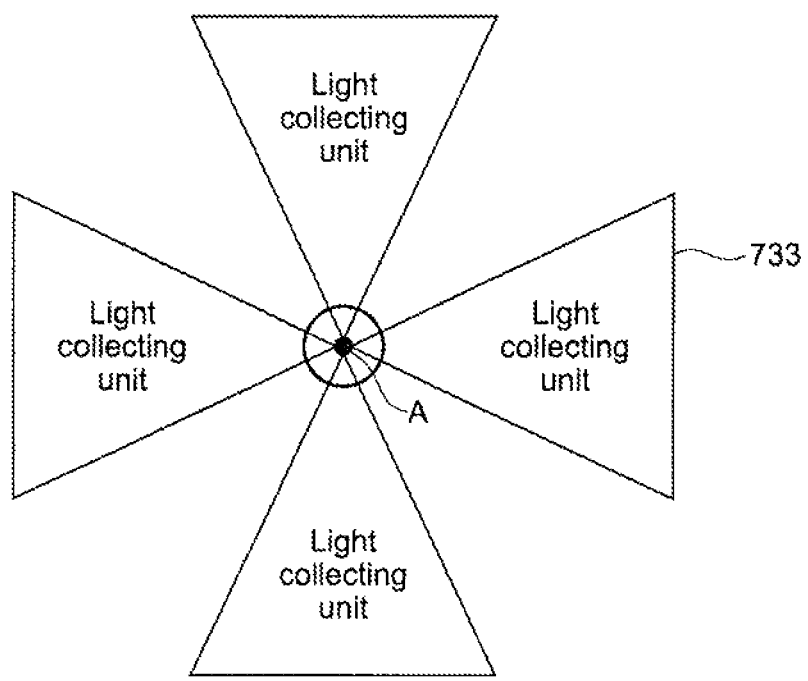

In FIG. 16B, a surface having a triangular shape in the planar shape is used as an arrangement surface on which the plurality of laser light sources are arranged. Therefore, the outer shape of the light collecting unit 733 can also be formed into a triangular shape. Since an aspheric reflecting surface is used as the light collecting optical system, the degree of freedom on the number of light sources, the arrangement thereof, and the like is increased. This is because the shape, size, and the like of the aspheric reflecting surface can be appropriately designed in accordance with light fluxes from the light sources. As a result, such a light source that a plurality of light sources are arranged on a triangular-shaped arrangement surface as shown in FIG. 16B can be used. Thus, the light collecting unit whose outer shape viewed from the optical-axis direction is a triangular shape can be achieved.

In such a manner, since the shape of the light collecting unit can be freely set, it is easy to form the light collecting unit into a shape appropriate to a multi-unit configuration and also arrange a plurality of light collecting units in a limited space. As a result, the downsizing of the light source apparatus can be achieved.

Additionally, arranging the plurality of light collecting units symmetrically with respect to the optical axis A can lead to the degree of freedom on the number of light collecting units and a combination of light collecting units having various shapes. As a result, it is possible to correspond to various specifications. It should be noted that the planar shape of the arrangement surface is not limited to a rectangular or triangular shape and may be a multangular shape, a circular shape, and the like. The shape of the arrangement surface may also be appropriately set according to the shape of a necessary light collecting unit.

In the image display apparatus 500 shown in FIG. 2, the illumination optical system 200 configured using a transmissive liquid crystal panel is described. However, the illumination optical system can also be configured using a reflective liquid crystal panel. A digital micro-mirror device (DMD) or the like may be used as the image generation element. Additionally, a color combining prism that combines video signals of RGB colors or of a polarization beam splitter (PBS), a total internal reflection (TIR) prism, and the like may be used, instead of the dichroic prism 340.

Further, in the above description, an apparatus other than the projector may be configured as the image display apparatus according to the present technology. In addition, the light source apparatus according to the present technology may be used for an apparatus other than the image display apparatus.

At least two of features of each embodiment described above can be combined.

It should be noted that the present technology can have the following configurations.

(1) An image display apparatus, including:
a light source section that includes a light source unit including one or more solid-state light sources;
an image generation section that generates an image based on light from the light source unit;
a projection section that projects the image generated by the image generation section;
a housing that includes an outer frame and an inlet, the outer frame surrounding the light source section, the image generation section, and the projection section, the inlet being formed in the outer frame and taking in external air;
a first sensor that is arranged in the vicinity of the inlet and measures a temperature of the external air as an external temperature, the external air being taken in from the inlet; and
a control section that controls output of the one or more fixed light sources based on the external temperature measured by the first sensor.

(2) The image display apparatus according to (1), in which the control section decreases the output of the one or more solid-state light sources in accordance with a rise of the external temperature.

(3) The image display apparatus according to (1) or (2), in which
in a case where a predetermined temperature is set as a first reference temperature and the external temperature is higher than the first reference temperature, the control section decreases the output in accordance with a temperature difference between the external temperature and the first reference temperature.

(4) The image display apparatus according to any one of (1) to (3), further including
a second sensor that is arranged in the light source unit and measures a temperature of the one or more solid-state light sources as a light source temperature, in which
the control section controls the output of the one or more fixed light sources based on the light source temperature measured by the second sensor.

(5) The image display apparatus according to (4), in which the control section decreases the output of the one or more solid-state light sources in accordance with a decrease of the light source temperature.

(6) The image display apparatus according to (4) or (5), in which
in a case where a predetermined temperature is set as a second reference temperature and the light source temperature is lower than the second reference temperature, the control section decreases the output in accordance with a temperature difference between the light source temperature and the second reference temperature.

(7) The image display apparatus according to any one of (1) to (6), in which
the image generation section includes
one or more light modulation elements that modulate incident light, and
an optical system that inputs light from the light source section to the one or more light modulation elements and outputs modulated light to the projection section, the modulated light being modulated by the one or more light modulation elements,
the image display apparatus further including:
a sending section that includes a filter and sends the external air to the optical system via the filter; and
a third sensor that is arranged in the optical system and measures a temperature of the optical system as an optical system temperature, in which
the control section determines a state of the filter based on the optical system temperature measured by the third sensor.

(8) The image display apparatus according to (7), in which
the one or more light modulation elements include three light modulation elements that respectively modulate red light, green light, and blue light,
the optical system includes a red optical system, a blue optical system, and a green optical system as optical systems for light of the respective colors, and
the third sensor is arranged in the blue optical system.

(9) The image display apparatus according to (8), in which
the blue optical system includes a polarizing plate that controls a polarization state of the blue light, and
the third sensor is arranged in the polarizing plate.

(10) The image display apparatus according to any one of (7) to (9), in which
in a case where a predetermined temperature is set as a third reference temperature and the optical system temperature is higher than the third reference temperature, the control section outputs an indication for a replacement of the filter.

(11) The image display apparatus according to any one of (7) to (9), in which
in a case where a predetermined temperature is set as a third reference temperature and the optical system temperature is higher than the third reference temperature, the control section stops an operation of the image display apparatus.

DESCRIPTION OF SYMBOLS

A optical axis
B1 blue laser light
G2 green light
R2 red light
W white light
30 light source unit
31 laser light source
40 phosphor unit
51 mount substrate
100 light source section
200 image generation section
220 illumination optical system
370 incident polarizing plate
380 outgoing polarizing plate
400 projection section
500 image display apparatus
501 outer frame 502 inlet
503 housing
510 sending section
511 filter
520 sensor mechanism
521 environmental temperature sensor (first sensor)
522 light source temperature sensor (second sensor)
523 optical system temperature sensor (third sensor)
525 control section

The invention claimed is:

1. An image display apparatus, comprising:
a laser light source;
a light modulator to generate an image based on light from the laser light source;
a first sensor to measure a first temperature in a vicinity of an air inlet of a housing of the image display apparatus;
a second sensor to measure a second temperature associated with the laser light source;
a third sensor to measure a third temperature corresponding to an optical member, included in an optical system, along an optical path between the laser light source and the light modulator or corresponding to the laser light source;
circuitry configured to control output of the laser light source based on at least one of the first, second, or third temperatures;
the optical system to receive light from the laser light source and output the light to the light modulator; and
an air circulator, which includes a filter, to direct air to the optical system via the filter, wherein
the circuitry is configured to determine a state of the filter based on the third temperature measured by the third sensor,
the light modulator is included in the optical system, and
when the third temperature is higher than a third reference temperature, the circuitry is configured to output an indication for replacement of the filter.

2. The image display apparatus according to claim 1, wherein
the circuitry is configured to decrease the output of the laser light source in accordance with a rise of the first temperature.

3. The image display apparatus according to claim 1, wherein the circuitry is configured to control the output of the laser light source based on the second temperature.

4. The image display apparatus according to claim 3, wherein the circuitry is configured to decrease the output of the laser light source in accordance with a decrease of the second temperature.

5. The image display apparatus according to claim 1, further comprising:
three light modulators, including the light modulator, that respectively modulate red light, green light, and blue light, wherein
the optical system includes an optical subsystem for each of the red, green, and blue lights, and
the third sensor is arranged in the optical subsystem for the blue light.

6. The image display apparatus according to claim 1, wherein the circuitry is configured to control the output of the laser light source based on two or more of the first, second, or third temperatures.

7. The image display apparatus according to claim 1, wherein the circuitry is configured to control the output of the laser light source based on the first, second, and third temperatures.

8. The image display apparatus according to claim 1, further comprising:
a phosphor wheel.

9. The image display apparatus according to claim 1, further comprising:
a lens to project the image generated by the light modulator.

10. The image display apparatus according to claim 1, further comprising:
the housing that includes the air inlet, wherein
the housing contains the laser light source and the light modulator, and
the air inlet allows external air to enter the housing.

11. The image display apparatus according to claim 1, where the third temperature corresponds to the optical member.

12. The image display apparatus according to claim 1, where the third temperature corresponds to the laser light source.

* * * * *